(12) United States Patent
DeMorin et al.

(10) Patent No.: US 12,497,367 B2
(45) Date of Patent: Dec. 16, 2025

(54) PROCESSES FOR THE PREPARATION OF A KINASE INHIBITOR

(71) Applicant: Exelixis, Inc., Alameda, CA (US)

(72) Inventors: Frenel DeMorin, Long Beach, CA (US); Khalid Shah, Half Moon Bay, CA (US); Sagar Shakya, San Diego, CA (US); Yong Wang, Foster City, CA (US); Wei Xu, Danville, CA (US)

(73) Assignee: Exelixis, Inc., Alameda, CA (US)

( * ) Notice: Subject to any disclaimer, the term of this patent is extended or adjusted under 35 U.S.C. 154(b) by 464 days.

(21) Appl. No.: 17/922,208

(22) PCT Filed: Apr. 30, 2021

(86) PCT No.: PCT/US2021/030035
§ 371 (c)(1),
(2) Date: Oct. 28, 2022

(87) PCT Pub. No.: WO2021/222673
PCT Pub. Date: Nov. 4, 2021

(65) Prior Publication Data
US 2023/0192619 A1   Jun. 22, 2023

Related U.S. Application Data

(60) Provisional application No. 63/017,739, filed on Apr. 30, 2020.

(51) Int. Cl.
*C07D 215/48* (2006.01)

(52) U.S. Cl.
CPC ................... *C07D 215/48* (2013.01)

(58) Field of Classification Search
CPC .................................... C07D 215/48
See application file for complete search history.

(56) References Cited

U.S. PATENT DOCUMENTS

| | | |
|---|---|---|
| 6,218,394 B1 | 4/2001 | Perregaard et al. |
| 2009/0197936 A1 | 8/2009 | Acemoglu et al. |
| 2014/0256938 A1 | 9/2014 | Wilson et al. |
| 2017/0217896 A1 | 8/2017 | Xu et al. |
| 2021/0032263 A1 | 2/2021 | Bannen et al. |
| 2021/0040076 A1* | 2/2021 | Bannen ............... C07D 401/12 |
| 2021/0040099 A1 | 2/2021 | Bannen et al. |

FOREIGN PATENT DOCUMENTS

| | | |
|---|---|---|
| CN | 1154105 A | 7/1997 |
| CN | 101466672 A | 6/2009 |
| CN | 109761899 A | 5/2019 |
| JP | 2013-531045 | 8/2013 |
| WO | 2007146715 A1 | 12/2007 |
| WO | 2012009722 A1 | 1/2012 |
| WO | 2019148044 A1 | 8/2019 |
| WO | 2020123800 A1 | 6/2020 |

OTHER PUBLICATIONS

International Search Report for PCT/US2021/030035 mailed Sep. 21, 2021.
Stahl, P. Heinrich, et al. Preparation of water-soluble compounds through salt formation. The Practice of Medicinal Chemistry. 2003; 610, 613-614.

* cited by examiner

*Primary Examiner* — Timothy R Rozof
(74) *Attorney, Agent, or Firm* — Honigman LLP; Heidi M. Berven; Li Gao

(57) ABSTRACT

The present invention relates to processes for the synthetic preparation of c-Met inhibitors of Formula I, or pharmaceutically acceptable salts thereof. The present invention further relates to processes for the synthetic preparation of the c-Met inhibitor, Compound 1, or a pharmaceutically acceptable salt thereof. The present invention also relates to processes for the synthetic preparation of Compound 1·hemifumarate. The invention further relates to large scale processes for the synthetic preparation of the c-Met inhibitor, Compound 1 and Compound 1·hemifumarate.

25 Claims, No Drawings

PROCESSES FOR THE PREPARATION OF A KINASE INHIBITOR

CROSS-REFERENCE TO RELATED APPLICATIONS

This application is a United States National Phase filing of PCT/US2021/030035, filed Apr. 30, 2021, which claims the benefit of priority to U.S. Provisional Application Ser. No. 63/017,739, filed Apr. 30, 2020, the entire contents of which are incorporated by reference herein.

TECHNICAL FIELD OF THE INVENTION

The present invention relates to processes for the preparation of c-Met inhibitors of Formula I, or pharmaceutically acceptable salts thereof. The present invention further relates to processes for the preparation of the c-Met inhibitor, Compound 1, or a pharmaceutically acceptable salt thereof. The present invention also relates to processes for the synthetic preparation of Compound 1·hemifumarate. The invention further relates to large-scale processes for the synthetic preparation of the c-Met inhibitor, Compound 1 and Compound 1·hemifumarate.

BACKGROUND OF THE INVENTION

Human Axl belongs to the Tyro3, Axl, and Mer (TAM) subfamily of receptor tyrosine kinases. TAM kinases are characterized by an extracellular ligand-binding domain consisting of two immunoglobulin-like domains and two fibronectin type III domains. Axl is overexpressed in a number of tumor cell types and was initially cloned from patients with chronic myelogenous leukemia. When overexpressed, Axl exhibits transforming potential. Axl signaling is believed to cause tumor growth through activation of proliferative and anti-apoptotic signaling pathways. Axl has been associated with cancers such as lung cancer, myeloid leukemia, uterine cancer, ovarian cancer, gliomas, melanoma, thyroid cancer, renal cell carcinoma, osteosarcoma, gastric cancer, prostate cancer, and breast cancer. The overexpression of Axl results in a poor prognosis for patients with the indicated cancers.

Activation of Mer, like Axl, conveys downstream signaling pathways that cause tumor growth and activation. Mer binds ligands such as the soluble protein Gas-6. Gas-6 binding to Mer induces autophosphorylation of Mer on its intracellular domain, resulting in downstream signal activation. Over-expression of Mer in cancer cells leads to increased metastasis, most likely by generation of soluble Mer extracellular domain protein as a decoy receptor. Tumor cells secrete a soluble form of the extracellular Mer receptor, which reduces the ability of soluble Gas-6 ligand to activate Mer on endothelial cells, leading to cancer progression.

Therefore, a need exists for compounds, and processes of producing the compounds in high yield and purity, that inhibit TAM receptor tyrosine kinases such as Axl and Mer for the treatment of selected cancers.

SUMMARY OF THE INVENTION

In one aspect, the invention includes a process for the preparation of a compound of Formula I

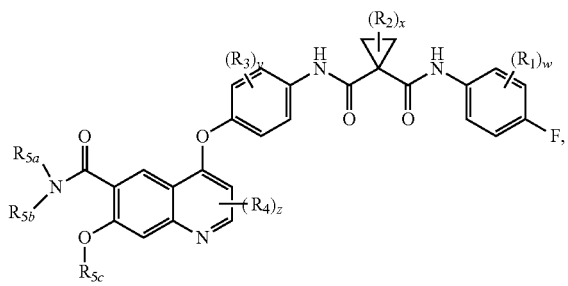

Formula I or a pharmaceutically acceptable salt thereof, comprising contacting a compound of Formula II

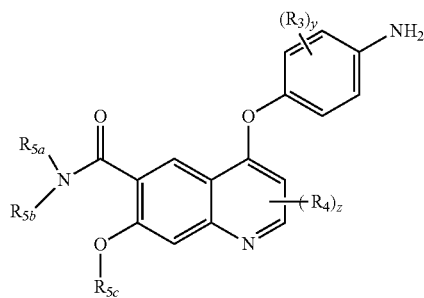

Formula II with a compound of Formula III

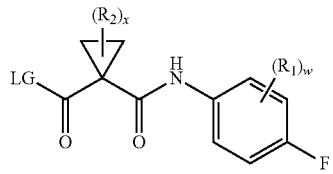

Formula III in the presence of a solvent and a base, wherein
LG is a leaving group selected from Cl, Br, I, HOAt, HOBt, and an organotriphosphate compound;
$R_1$ is selected from halo, $C_{1-6}$ alkyl, $C_{1-6}$ alkoxy, and $C_{3-6}$ cycloalkyl;
$R_2$ and $R_3$ are each independently selected from halo and $C_{1-6}$ alkyl;
$R_4$ is selected from halo, $C_{1-6}$ alkyl, $C_{1-6}$ alkoxy, $C_{3-6}$ cycloalkyl, $C_{3-6}$ heterocycloalkyl, phenyl, and $C_{3-6}$ heteroaryl;
$R_{5a}$ is selected from H, —$NH_2$, —OH, $C_{1-8}$ alkyl, $C_{3-6}$ cycloalkyl, $C_{3-6}$ heterocycloalkyl, phenyl, and $C_{3-6}$ heteroaryl, wherein up to three methylene units of the $C_{1-8}$ alkyl are optionally and independently replaced with —O—, NR'—, —C(O)—, —C(O)O—, and —C(O)NR'—, wherein $R_{5a}$ is optionally substituted with up to three substituents selected from halo, CN, OH, $NO_2$, $NH_2$, SH, OR', C(O)OR', C(O)R', C(O)NR'$_2$, $C_{1-4}$ alkyl, $C_{3-6}$ cycloalkyl, $C_{3-6}$ heterocycloalkyl, and $C_{3-6}$ heteroaryl;
$R_{5b}$ is H or $C_{1-6}$ alkyl; or
$R_{5a}$ and $R_{5b}$ together with the nitrogen to which they are attached form a $C_{3-6}$ heterocycloalkyl optionally substituted with halo, CN, OH, NO$_2$, NH$_2$, SH, OR',
C(O)OR', C(O)R', C(O)NR'$_2$, C$_{1-4}$ alkyl, C$_{3-6}$ cycloalkyl, C$_{3-6}$ heterocycloalkyl, or C$_{3-6}$ heteroaryl;

R$_{5c}$ is H or C$_{1-6}$ alkyl optionally substituted with halo, CN, OH, NH$_2$, or OR';

R' is H or C$_{1-6}$ alkyl, and w, x, y, and z are each independently an integer from 0 to 4;

and wherein the process optionally further comprises contacting the compound of Formula I with an acid to produce a pharmaceutically acceptable salt of the compound of Formula I.

In another aspect, the invention includes a process for the preparation of Compound 1 (N-(4-fluorophenyl)-N-(4-((7-methoxy-6-(methylcarbamoyl)quinolin-4-yl)oxy)phenyl) cyclopropane-1,1-dicarboxamide):

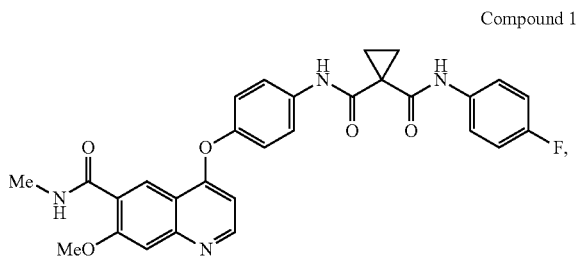 [SMILES: CNC(=O)c1cc2c(Oc3ccc(NC(=O)C4(C(=O)Nc5ccc(F)cc5)CC4)cc3)ccnc2cc1OC]

Compound 1 or a pharmaceutically acceptable salt thereof, comprising contacting Compound 4

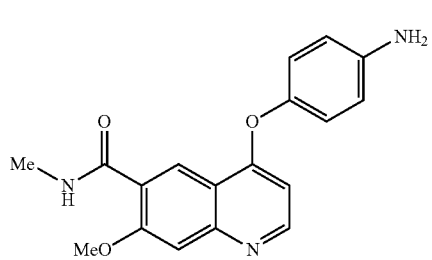

4 with a compound of Formula III'

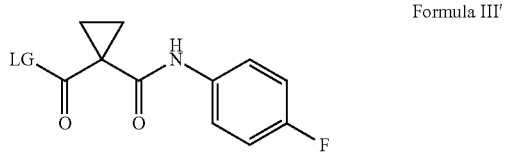

Formula III' in the presence of a solvent and a base, wherein LG is a leaving group selected from Cl, Br, I, HOAt, HOBt, and an organotriphosphate compound, and wherein the process optionally further comprises contacting the compound of Compound 1 with an acid to produce a pharmaceutically acceptable salt of the compound of Compound 1.

Small-molecule compounds that specifically inhibit, regulate, and/or modulate the signal transduction of TAM kinases, such as Axl and Mer as described above, are particularly desirable as a means to treat or prevent disease states associated with abnormal cell proliferation and angiogenesis. Compound 1 is one such small-molecule compound. The biological activity of Compound 1 is disclosed in PCT/US2019/015297, filed Jan. 25, 2019, the entire contents of which is incorporated herein by reference. Also disclosed in PCT/US2019/015297 is a separate and unrelated synthetic process to Compound 1 (see Example 4). A separate and unrelated process to prepare Compound 1 Hemifumarate is disclosed in U.S. Ser. No. 62/779,430 (see Example 2 and paragraphs 360-375), filed Dec. 13, 2018, the entire contents of which is also incorporated herein by reference. The present disclosure provides improved processes for preparing Compound 1 and Compound 1·hemifumarate, which were obtained in surprisingly high yield and purity.

DETAILED DESCRIPTION OF THE INVENTION

Definitions and Abbreviations

Solvents

| Abbreviations/Acronyms | Full Name/Description |
|---|---|
| ACN | Acetonitrile |
| AcOH | Acetic acid |
| DMA | Dimethylacetamide |
| DCM | Dichloromethane |
| DMSO | Dimethylsulfoxide |
| EtOAc | Ethyl acetate |
| EtOH | Ethanol |
| HFIPA | Hexafluoroisopropanol |
| IPA | Isopropyl alcohol, 2-propanol |
| MEK | Methyl ethyl ketone |
| MeOH | Methanol |
| MTBE | Methyl-tertiary-butyl ether |
| TFE | 2,2,2-Trifluoroethanol |
| THF | Tetrahydrofuran |
| HOBt | Hydroxybenzotriazole |
| HOAt | 1-Hydroxy-7-azabenzotriazole |

As used herein, the following definitions shall apply unless otherwise indicated.

For purposes of this invention, the chemical elements are identified in accordance with the Periodic Table of the Elements, CAS version, Handbook of Chemistry and Physics, 95th Ed. Additionally, general principles of organic chemistry are described in "Organic Chemistry," 2$^{nd}$ Ed., Thomas Sorrell, University Science Books, Sausalito: 2006, and "March's Advanced Organic Chemistry," 7th Ed., Ed.: Smith, M. B. and March, J., John Wiley & Sons, New York: 2013, the entire contents of which are hereby incorporated by reference.

As used herein, the term "about" or "approximate" or "approximately" includes (and describes) embodiments that are directed to that value or parameter per se. In certain embodiments, the term "about" or "approximate" or "approximately" includes the indicated amount ±10%. In other embodiments, the term "about" "approximate" or "approximately" includes the indicated amount ±5%. In certain other embodiments, the term "about" "approximate" or "approximately" includes the indicated amount ±1%.

As used herein, the term "slurry" refers to a suspension prepared by adding enough solids to a given solvent at ambient conditions so that undissolved solids are present. A typical slurry includes agitation (typically by stirring or oscillation), an act that is also referred to as "slurrying," in a sealed vial at a given temperature for an extended period of time. Typically, the solids are recovered after a given period of time using a method described herein.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, immunogenicity or other problem or complication, commensurate with a reasonable benefit risk ratio.

As used herein, the term "catalytic amount" means an amount that is less than a stoichiometric equivalent of the limiting reagent. In some embodiments, a catalytic amount is much less than a stoichiometric equivalent of the limiting reagent, for example, between 0 and 5 wt %, between 0 and 4 wt %, between 0 and 3 wt %, between 0 and 2 wt %, between 0 and 1 wt %, between 0 and 0.9 wt %, between 0 and 0.8 wt %, between 0 and 0.7 wt %, between 0 and 0.6 wt %, between 0 and 0.5 wt %, between 0 and 0.4 wt %, between 0 and 0.3 wt %, between 0 and 0.2 wt %, between 0 and 0.1 wt %, between 0 and 0.05 wt %, and between 0 and 0.01 wt % of the stoichiometric amount of the limiting reagent.

In general, the nomenclature used in this application is based on naming conventions adopted by the international union of pure and applied chemistry (IUPAC). Chemical structures shown herein were prepared using CHEMDRAW®. Any open valency appearing on a carbon, oxygen, or nitrogen atom in the structures herein indicates the presence of a hydrogen atom.

The symbol "—" means a single bond, and "═" means a double bond.

As used herein, the singular forms "a," "an," and "the" include plural reference unless the context clearly dictates otherwise.

When a variable is defined generically, with a number of possible substituents, each individual radical can be defined with our without the bond. For example, if $R^z$ can be hydrogen, this can be indicated as "—H" or "H" in the definition of $R^z$.

When chemical structures are depicted or described, unless explicitly stated otherwise, all carbons are assumed to have hydrogen substitution to conform to a valence of four. For example, in the structure on the left-hand side of the schematic below, there are nine hydrogens implied. The nine hydrogens are depicted in the right-hand structure. Sometimes a particular atom in a structure is described in textual formula as having a hydrogen or hydrogens as substitution (expressly defined hydrogen), for example, —CH₂CH₂—. It is understood by one of ordinary skill in the art that the aforementioned descriptive techniques are common in the chemical arts to provide brevity and simplicity to description of otherwise complex structures.

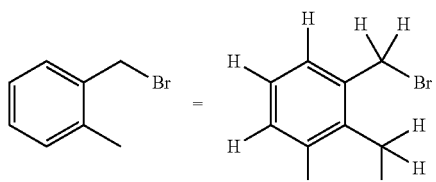

If a group "R" is depicted as "floating" on a ring system, as for example in the formula:

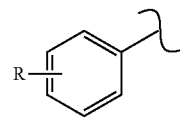

then, unless otherwise defined, a substituent "R" may reside on any atom of the ring system, assuming replacement of a depicted, implied, or expressly defined hydrogen from one of the ring atoms, so long as a stable structure is formed.

If a group "R" is depicted as floating on a fused ring system, as for example in the formulae:

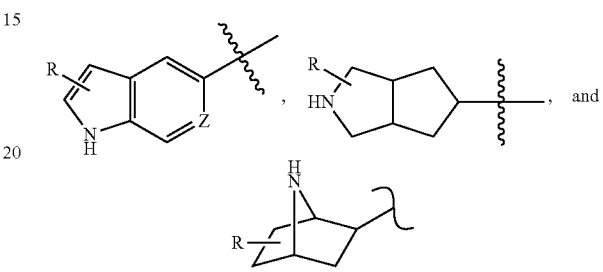

then, unless otherwise defined, a substituent "R" may reside on any atom of the fused ring system, assuming replacement of a depicted hydrogen (for example the —NH— in the formula above), implied hydrogen (for example, in the formula above, where the hydrogens are not shown but understood to be present), or expressly defined hydrogen (for example, where in the formula above, "Z" equals ═CH—) from one of the ring atoms, so long as a stable structure is formed. In the example depicted, the "R" group may reside on either the 5-membered or the 6-membered ring of the fused ring system. When a group "R" is depicted as existing on a ring system containing saturated carbons, for example in the formula:

where, in this example, "v" can be more than one, assuming each replaces a currently depicted, implied, or expressly defined hydrogen on the ring; then, unless otherwise defined, where the resulting structure is stable, two "R's" may reside on the same carbon. A simple example is when R is a methyl group, there can exist a geminal dimethyl on a carbon of the depicted ring (an "annular" carbon). In another example, two R's on the same carbon, including that carbon, may form a ring, thus creating a spirocyclic ring (a "spirocyclyl" group) structure with the depicted ring as for example in the formula:

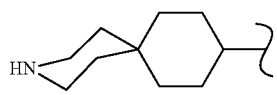

Unless otherwise stated, a bifunctional group can have the orientation as written, or the reverse orientation. For example, for the bifunctional group "—C(O)NH—", the present disclosure also includes the reverse orientation "—NHC(O)—".

"Halogen" or "halo" refers to fluorine, chlorine, bromine, or iodine.

The term "$C_{n-m}$" or "$C_n$-$C_m$" indicates a range which includes the endpoints, wherein n and m are integers and indicate the number of carbons. Examples include $C_{1-4}$, $C_1$-$C_4$, $C_{1-6}$, $C_1$-$C_6$, and the like.

"Alkyl" refers to a branched or straight hydrocarbon chain, such as methyl, ethyl, n-propyl, isopropyl, n-butyl, isobutyl, sec-butyl, t-butyl, pentyl, hexyl, and heptyl. In some embodiments, the alkyl group can have one to eight carbon atoms. ($C_1$-$C_6$)alkyl is preferred. The term "$C_{n-m}$ alkyl" or ($C_n$-$C_m$) alkyl, refers to an alkyl group having n to m carbon atoms. When optionally substituted, one or more hydrogen atoms of the alkyl group (e.g., from 1 to 4, from 1 to 2, or 1) may be replaced with a moiety as described below under "Optional Substitution." In some aspects, the alkyl group is unsubstituted or not optionally substituted.

"Alkylene" refers to an optionally substituted bivalent saturated aliphatic radical having from 1 to 10 carbon atoms, 1 to 8 carbon atoms, 1 to 6 carbon atoms, 1 to 4 carbon atoms, or 1 to 2 carbon atoms. When optionally substituted, one or more hydrogen atoms of the alkylene group (e.g., from 1 to 4, from 1 to 2, or 1) may be replaced with a moiety as described below under "Optional Substitution." In some aspects, the alkylene group is unsubstituted or not optionally substituted. The term "Cn-m alkylene" refers to an alkylene group having n to m carbon atoms. Examples of alkylene groups include, but are not limited to, methylene, ethan-1,2-diyl, propan-1,3-diyl, propan-1,2-diyl, butan-1,4-diyl, butan-1,3-diyl, butan-1,2-diyl, 2-methyl-propan-1,3-diyl and the like.

The term "alkenyl" refers to a straight-chain or branched hydrocarbon group corresponding to an alkyl group having one or more double carbon-carbon bonds. An alkenyl group formally corresponds to an alkene with one C—H bond replaced by the point of attachment of the alkenyl group to the remainder of the compound. The term "$C_{n-m}$ alkenyl" or ($C_n$-$C_m$) alkenyl refers to an alkenyl group having n to m carbons. In some embodiments, the alkenyl moiety contains 2 to 6, 2 to 4, or 2 to 3 carbon atoms. Example alkenyl groups include, but are not limited to, ethenyl, n-propenyl, isopropenyl, n-butenyl, sec-butenyl, and the like.

The term "alkynyl" refers to a straight-chain or branched hydrocarbon group corresponding to an alkyl group having one or more triple carbon-carbon bonds. An alkynyl group formally corresponds to an alkyne with one C—H bond replaced by the point of attachment of the alkyl group to the remainder of the compound. The term "$C_{n-m}$ alkynyl" or ($C_n$-$C_m$) alkynyl refers to an alkynyl group having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

"Alkoxy" refers to a moiety of the formula —$OR_i$, wherein $R_i$ is an ($C_1$-$C_6$)alkyl moiety as defined herein. The term "$C_{n-m}$ alkoxy" or ($C_n$-$C_m$) alkoxy refers to an alkoxy group, the alkyl group of which has n to m carbons. Examples of alkoxy moieties include, but are not limited to, methoxy, ethoxy, isopropoxy, and the like.

An alkoxy group can be unsubstituted or optionally substituted. When optionally substituted, one or more hydrogen atoms of the alkoxy group (e.g., from 1 to 4, from 1 to 2, or 1) may be replaced with a moiety as described below under "Optional Substitution," with the proviso that no hydrogen atom alpha to the ether oxygen is replaced by a hydroxy, amino, or thio group. In some aspects, the alkoxy group is unsubstituted or not optionally substituted.

"Alkoxycarbonyl" refers to a group —C(O)—$R_i$ wherein $R_i$ is ($C_1$-$C_6$)alkoxy as defined herein.

The term "amino" refers to a group of formula —$NH_2$.

The term "carbamyl" refers to a group of formula —C(O)$NH_2$.

The term "carbonyl", employed alone or in combination with other terms, refers to a —C(=O)— group, which also may be written as C(O).

The term "cyano" or "nitrile" refers to a group of formula —CN, which also may be written as —CN or CN.

The term "oxo" refers to an oxygen atom as a divalent substituent, forming a carbonyl group when attached to carbon, or attached to a heteroatom forming a sulfoxide or sulfone group, or an N-oxide group. In some embodiments, heterocyclic groups may be optionally substituted by 1 or 2 oxo (=O) substituents.

The term "sulfide" refers to a sulfur atom as a divalent substituent, forming a thiocarbonyl group (C=S) when attached to carbon.

The term "heteroatom" used herein is meant to include boron, phosphorus, sulfur, oxygen, and nitrogen.

The term "haloalkyl" as used herein refers to an alkyl group in which one or more of the hydrogen atoms has been replaced by one or more halogen atoms. The term "$C_{n-m}$ haloalkyl" or ($C_n$-$C_m$) haloalkyl refers to a $C_{n-m}$ alkyl group having n to m carbon atoms and from at least one up to {2(n to m)+1} halogen atoms, which may either be the same or different. In some embodiments, the halogen atoms are fluoro atoms. In some embodiments, the haloalkyl group has 1 to 6 or 1 to 4 carbon atoms. Example haloalkyl groups include $CF_3$, $C_2F_5$, $CHF_2$, $CCl_3$, $CHCl_2$, $C_2Cl_5$, and the like. In some embodiments, the haloalkyl group is a fluoroalkyl group.

The term "haloalkoxy," employed alone or in combination with other terms, refers to a group of formula —O-haloalkyl, wherein the haloalkyl group is as defined above. The term "$C_{n-m}$ haloalkoxy" or ($C_n$-$C_m$) haloalkoxy refers to a haloalkoxy group, the haloalkyl group of which has n to m carbons. Example haloalkoxy groups include trifluoromethoxy and the like. In some embodiments, the haloalkoxy group has 1 to 6, 1 to 4, or 1 to 3 carbon atoms.

"Aryl" means a monovalent six- to fourteen-membered, mono- or bi-carbocyclic or tri-carbocyclic ring (e.g., having two fused rings), wherein the monocyclic ring is aromatic and at least one of the rings in the bicyclic ring is aromatic. The term "$C_{n-m}$ aryl" or "($C_n$-$C_m$) aryl" refers to an aryl group having from n to m ring carbon atoms. In some embodiments, aryl groups have from 6 to approximately 10 carbon atoms. In some embodiments aryl groups have 6 ring carbon atoms. In some embodiments aryl groups have 10 ring carbon atoms. Unless stated otherwise, the valency of the group may be located on any atom of any ring within the radical, valency rules permitting. Representative examples include phenyl, naphthyl, and indanyl, and the like.

An aryl group can be unsubstituted or optionally substituted. When optionally substituted, one or more hydrogen atoms of the aryl group (e.g., from 1 to 5, from 1 to 2, or 1) may be replaced with a moiety as described below under "Optional Substitution." In some aspects, the alkoxy group is unsubstituted or not optionally substituted.

"Arylene" means a divalent six- to fourteen-membered, mono- or bi-carbocyclic or tri-carbocyclic ring, wherein the monocyclic ring is aromatic and at least one of the rings in the bicyclic or tricyclic ring is aromatic. Representative examples include phenylene, naphthylene, and indanylene, and the like.

"Cycloalkyl" refers to a non-aromatic hydrocarbon ring system (monocyclic, bicyclic, or polycyclic), including cyclized alkyl and alkenyl groups. The term "Cn-m cycloalkyl" or "($C_n$-$C_m$) cycloalkyl" refers to a cycloalkyl that has n to m ring member carbon atoms. Cycloalkyl groups can include mono- or polycyclic (e.g., having 2, 3, or 4 fused rings) groups and spirocycles. Cycloalkyl groups can have 3, 4, 5, 6, 7, 8, 9, 10, 11, 12, 13, or 14 ring-forming carbons ($C_{3-14}$). In some embodiments, the cycloalkyl group has 3 to 14 members, 3 to 10 members, 3 to 6 ring members, 3 to 5 ring members, or 3 to 4 ring members. In some embodiments, the cycloalkyl group is monocyclic. In some embodiments, the cycloalkyl group is monocyclic or bicyclic. In some embodiments, the cycloalkyl group is a $C_{3-6}$ monocyclic cycloalkyl group. Ring-forming carbon atoms of a cycloalkyl group can be optionally oxidized to form an oxo or sulfido group. Cycloalkyl groups also include cycloalkylidenes. In some embodiments, cycloalkyl is cyclopropyl, cyclobutyl, cyclopentyl, or cyclohexyl. Examples of cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, bicyclo[1.1.1]pentanyl, bicyclo[2.1.1]hexanyl, and the like. In some embodiments, the cycloalkyl group is cyclopropyl, cyclobutyl, cyclopentyl, or cyclohexyl. In some embodiments, cycloalkyl includes a single saturated carbocyclic ring of three to eight ring carbons, such as cyclopropyl, cyclobutyl, cyclopentyl, and cyclohexyl. Cycloalkyl may optionally be substituted with one or more substituents, such as one, two, or three substituents. In some embodiments, the cycloalkyl substituent is selected from the group consisting of ($C_1$-$C_6$)alkyl, hydroxy, ($C_1$-$C_6$)alkoxy, halo($C_1$-$C_6$)alkyl, halo($C_1$-$C_6$)alkoxy, halo, amino, mono- and di($C_1$-$C_6$)alkylamino, hetero($C_1$-$C_6$)alkyl, acyl, aryl, and heteroaryl.

A cycloalkyl group can be unsubstituted or optionally substituted. When optionally substituted, one or more hydrogen atoms of the cycloalkyl group (e.g., from 1 to 4, from 1 to 2, or 1) may be replaced with a moiety as described below under "Optional Substitution." In some aspects, a substituted cycloalkyl group can incorporate an exo- or endocyclic alkene (e.g., cyclohex-2-en-1-yl). In some aspects, a cycloalkyl group is unsubstituted or not optionally substituted.

"Cycloalkyloxycarbonyl" means a group —C(O)—O$R_i$, wherein $R_i$ is ($C_3$-$C_6$)cycloalkyl as defined herein.

"Phenyloxycarbonyl" refers to a group —C(O)—O-phenyl.

"Heteroaryl" means a monocyclic, fused bicyclic, or fused tricyclic, monovalent radical of 5 to 14 ring atoms containing one or more, preferably one, two, three, or four ring heteroatoms independently selected from —O—, —S(O)$_n$— (n is 0, 1, or 2), —N—, and —N($R_i$)—, and the remaining ring atoms being carbon, wherein the ring comprising a monocyclic radical is aromatic and wherein at least one of the fused rings comprising a bicyclic or tricyclic radical is aromatic. One or two ring carbon atoms of any nonaromatic rings comprising a bicyclic or tricyclic radical may be replaced by a —C(O)—, —C(S)—, or —C(=NH)— group. $R_i$ is hydrogen, alkyl, hydroxy, alkoxy, acyl, or alkylsulfonyl. Unless stated otherwise, the valency may be located on any atom of any ring of the heteroaryl group, valency rules permitting. In particular, when the point of valency is located on the nitrogen, an additional nitrogen substituent is not present. More specifically, the term heteroaryl includes, but is not limited to, 1,2,4-triazolyl, 1,3,5-triazolyl, phthalimidyl, pyridinyl, pyrrolyl, imidazolyl, thienyl, furanyl, indolyl, 2,3-dihydro-1H-indolyl (including, for example, 2,3-dihydro-1H-indol-2-yl or 2,3-dihydro-1H-indol-5-yl, and the like), isoindolyl, indolinyl, isoindolinyl, benzimidazolyl, benzodioxol-4-yl, benzofuranyl, cinnolinyl, indolizinyl, naphthyridin-3-yl, phthalazin-3-yl, phthalazin-4-yl, pteridinyl, purinyl, quinazolinyl, quinoxalinyl, tetrazoyl, pyrazolyl, pyrazinyl, pyrimidinyl, pyridazinyl, oxazolyl, isooxazolyl, oxadiazolyl, benzoxazolyl, quinolinyl, isoquinolinyl, tetrahydroisoquinolinyl (including, for example, tetrahydroisoquinolin-4-yl or tetrahydroisoquinolin-6-yl, and the like), pyrrolo[3,2-c]pyridinyl (including, for example, pyrrolo[3,2-c]pyridin-2-yl or pyrrolo[3,2-c]pyridin-7-yl, and the like), benzopyranyl, thiazolyl, isothiazolyl, thiadiazolyl, benzothiazolyl, benzothienyl, and the derivatives thereof, and N-oxide or a protected derivative thereof.

A five-membered heteroaryl ring is a heteroaryl group having five ring atoms wherein one or more (e.g., 1, 2, 3, or 4) ring atoms are independently selected from N, O, and S. Exemplary five-membered ring heteroaryls include thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl.

A six-membered heteroaryl ring is a heteroaryl group having six ring atoms wherein one or more (e.g., 1, 2, 3, or 4) ring atoms are independently selected from N, O, and S. Exemplary six-membered ring heteroaryls are pyridyl, pyrazinyl, pyrimidinyl, triazinyl, and pyridazinyl.

"Heteroarylene" means a monocyclic, fused bicyclic, or fused tricyclic, divalent radical of 5 to 14 ring atoms containing one or more, preferably one, two, three, or four ring heteroatoms independently selected from —O—, —S(O)$_n$— (n is 0, 1, or 2), —N—, and —N($R^{19}$)—, and the remaining ring atoms being carbon, wherein the ring comprising a monocyclic radical is aromatic and wherein at least one of the fused rings comprising a bicyclic or tricyclic radical is aromatic. One or two ring carbon atoms of any nonaromatic rings comprising a bicyclic or tricyclic radical may be replaced by a —C(O)—, —C(S)—, or —C(=NH)— group. $R^{19}$ is hydrogen, alkyl, or alkenyl. Unless stated otherwise, the valencies may be located on any atom of any ring of the heteroarylene group, valency rules permitting. In particular, when the point of valency is located on the nitrogen, an additional nitrogen substituent is not present. More specifically, the term heteroaryl includes, but is not limited to, thien-diyl, benzo[d]isoxazol-diyl, benzo[d]isothiazol-diyl, 1H-indazol-diyl (optionally substituted at the N1 position with $R^{19}$), benzo[d]oxazol-diyl, benzo[d]thiazol-diyl, 1H-benzo[d]imidazol-diyl (optionally substituted at the N1 position with $R^{19}$), 1H-benzo[d][1,2,3]triazol-diyl (optionally substituted at the N1 position with $R^{19}$), imidazo[1,2-a]pyridin-diyl, cinnolin-diyl, quinolin-diyl, pyridin-diyl, 1-oxido-pyridin-diyl, [1,2,4]triazolo[4,3-a]pyridin-diyl, and 2,3-dihydroimidazo[1,2-a]pyridin-diyl, and the like.

As used herein, "heterocycloalkyl" or "heterocyclo" refer to a non-aromatic ring or ring system, which may optionally contain one or more alkenylene groups as part of the ring structure, which has at least one heteroatom ring member independently selected from boron, nitrogen, sulfur, oxygen, and phosphorus, and which has 4-14 ring members, 4-10 ring members, 4-7 ring members, or 4-6 ring members. Included within the term "heterocycloalkyl" are monocyclic 4-, 5-, 6-, and 7-membered heterocycloalkyl groups. Heterocycloalkyl groups can include mono- or bicyclic or polycyclic (e.g., having two or three fused or bridged rings) ring systems or spirorcycles. In some embodiments, the heterocycloalkyl group is a monocyclic group having 1, 2, or 3 heteroatoms independently selected from nitrogen, sulfur, and oxygen. Ring-forming carbon atoms and heteroatoms of a heterocycloalkyl group can be optionally oxidized to form an oxo or sulfido group or other oxidized linkage (e.g., C(O), S(O), C(S), S(O)$_2$, N-oxide, and the like) or a nitrogen atom can be quaternized. The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the heterocycloalkyl ring, e.g., benzo or thienyl derivatives of piperidine, morpholine, azepine, and the like. A heterocycloalkyl group containing a fused aromatic ring can be attached through any ring-forming atom, including a ring-forming atom of the fused aromatic ring. Examples of heterocycloalkyl groups include azetidinyl, azepanyl, dihydrobenzofuranyl, dihydrofuranyl, dihydropyranyl, morpholino, 3-oxa-9-azaspiro[5.5]undecanyl, 1-oxa-8-azaspiro[4.5]decanyl, piperidinyl, piperazinyl, oxopiperazinyl, pyranyl, pyrrolidinyl, quinuclidinyl, tetrahydrofuranyl, tetrahydropyranyl, 1,2,3,4-tetrahydroquinolinyl, tropanyl, 4,5,6,7-tetrahydrothiazolo[5,4-c]pyridinyl, and thiomorpholino.

"Heterocycloalkyl" or "heterocyclo," can be unsubstituted or optionally substituted. When optionally substituted, one or more hydrogen atoms of the group (e.g., from 1 to 4, from 1 to 2, or 1) may be replaced with a moiety independently selected from fluoro, hydroxy, alkoxy, amino, alkylamino, acylamino, thio, and alkylthio. In some aspects, a substituted heterocycyl group can incorporate an exo- or endocyclic alkene (e.g., cyclohex-2-en-1-yl). In some aspects, the heterocycyl group is unsubstituted or not optionally substituted.

Embodiments

In one aspect, the invention includes a process for the preparation of a compound of Formula I Formula I

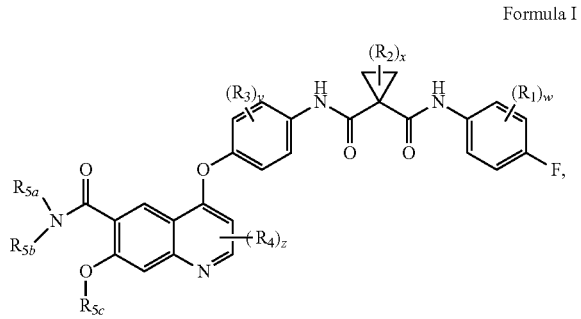

or a pharmaceutically acceptable salt thereof, comprising contacting a compound of Formula II Formula II

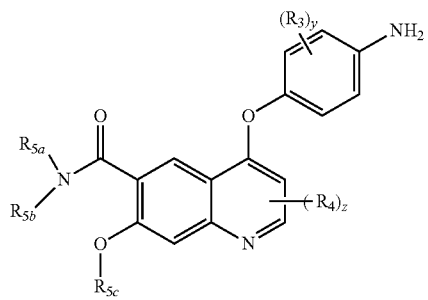

with a compound of Formula III

Formula III

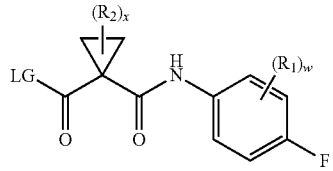

in the presence of a solvent and a base, wherein

LG is a leaving group selected from Cl, Br, I, HOAt, HOBt, and an organotriphosphate compound;

$R_1$ is selected from halo, $C_{1-6}$ alkyl, $C_{1-6}$ alkoxy, and $C_{3-6}$ cycloalkyl;

$R_2$ and $R_3$ are each independently selected from halo and $C_{1-6}$ alkyl;

$R_4$ is selected from halo, $C_{1-6}$ alkyl, $C_{1-6}$ alkoxy, $C_{3-6}$ cycloalkyl, $C_{3-6}$ heterocycloalkyl, phenyl, and $C_{3-6}$ heteroaryl;

$R_{5a}$ is selected from H, OH, NH$_2$, $C_{1-8}$ alkyl, $C_{3-6}$ cycloalkyl, $C_{3-6}$ heterocycloalkyl, phenyl, and $C_{3-6}$ heteroaryl, wherein up to three methylene units of the $C_{1-8}$ alkyl are optionally and independently replaced with —O—, NR'—, —C(O)—, —C(O)O—, and —C(O)NR'—, wherein $R_{5a}$ is optionally substituted with up to three substituents selected from halo, CN, OH, NO$_2$, NH$_2$, SH, OR', C(O)OR', C(O)R', C(O)NR'$_2$, $C_{1-4}$ alkyl, $C_{3-6}$ cycloalkyl, $C_{3-6}$ heterocycloalkyl, and $C_{3-6}$ heteroaryl;

$R_{5b}$ is H or $C_{1-6}$ alkyl; or $R_{5a}$ and $R_{5b}$ together with the nitrogen to which they are attached form a $C_{3-6}$ heterocycloalkyl optionally substituted with halo, CN, OH, NO$_2$, NH$_2$, SH, OR', C(O)OR', C(O)R', C(O)NR'$_2$, $C_{1-4}$ alkyl, $C_{3-6}$ cycloalkyl, $C_{3-6}$ heterocycloalkyl, or $C_{3-6}$ heteroaryl;

$R_{5c}$ is H or $C_{1-6}$ alkyl optionally substituted with halo, CN, OH, NH$_2$, or OR';

R' is H or $C_{1-6}$ alkyl, and w, x, y, and z are each independently an integer from 0 to 4;

and wherein the process optionally further comprises contacting the compound of Formula I with an acid to produce a pharmaceutically acceptable salt of the compound of Formula I. In some embodiments, the acid is fumaric acid.

In one embodiment of this aspect, LG is an organotriphosphate coupling agent, such as T3P® (2,4,6-tripropyl-1,3,5,2,4,6-trioxatriphosphinane 2,4,6-trioxide; propylphosphonic acid anhydride), which has the structure

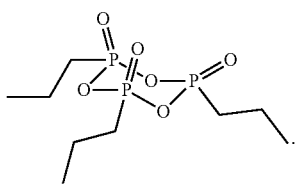 [SMILES: CCCP1(=O)OP(=O)(CCC)OP(=O)(CCC)O1]

In one embodiment of this aspect, the base is an inorganic base. In one embodiment, the base is selected from NaOH, Na₂CO₃, K₂CO₃, NaHCO₃, and KHCO₃. In a further embodiment, the base is Na₂CO₃. In a further embodiment, the base is K₂CO₃.

In one embodiment, the solvent is a mixture of water and an organic solvent.

In one embodiment, the organic solvent is selected from a polar protic and a polar aprotic solvent. In one embodiment, the polar protic or polar aprotic solvent is selected from the group consisting of acetone, acetonitrile, butanediol, dimethylformamide, dimethoxyethane, dimethyl sulfoxide, 1,4-dioxane, ethanol, ethylene glycol, furfuryl alcohol, glycerol, methanol, methyl isocyanide, N-methyl-2-pyrrolidone, 1-propanol, 1,3-propanediol, 1,5-pentanediol, 2-propanol, propylene glycol, tetrahydrofuran, and triethylene glycol. In a further embodiment, the organic solvent is a polar aprotic solvent selected from the group consisting of acetone, acetonitrile, dimethylformamide, 1,4-dioxane, and tetrahydrofuran. In still a further embodiment, the organic solvent is a mixture of water and tetrahydrofuran. In still a further embodiment, the mixture is from approximately 2:1 tetrahydrofuran:water to approximately 8:1, or from approximately 2:1 tetrahydrofuran:water to approximately 6:1, or from approximately 2:1 tetrahydrofuran:water to approximately 4:1. In still a further embodiment, the mixture is from approximately 2:1 tetrahydrofuran:water to approximately 3:1 tetrahydrofuran:water.

In one embodiment, a compound of Formula II is contacted with the compound of Formula III by adding a solution of a compound of Formula III dissolved in a first solvent to a solution of a compound of Formula II dissolved in a second solvent, to create a reaction mixture.

In one embodiment, the first solvent is an organic solvent. In a further embodiment, the first solvent is a polar aprotic solvent. In a further embodiment, the first solvent is tetrahydrofuran.

In one embodiment, the second solvent is a mixture of water and tetrahydrofuran. In one embodiment, the second solvent is a mixture from approximately 2:1 tetrahydrofuran:water to approximately 8:1, or from approximately 2:1 tetrahydrofuran:water to approximately 6:1, or from approximately 2:1 tetrahydrofuran:water to approximately 4:1. In a further embodiment, the second solvent is a mixture of from approximately 3:1 to approximately 2:1 tetrahydrofuran:water. In a further embodiment, the second solvent is a mixture of approximately 2:1 tetrahydrofuran:water.

In one embodiment, the compound of Formula III dissolved in a first solvent is added to a solution of a compound of Formula II dissolved in a second solvent over a period of approximately 30 minutes to approximately 1 hour. In another embodiment, the compound of Formula III dissolved in a first solvent is added to a solution of a compound of Formula II dissolved in a second solvent over a period of no less than 30 minutes.

In one embodiment, the temperature of the reaction mixture is maintained below about 27° C. In another embodiment, the reaction temperature is maintained at approximately 20 to 27° C. In another embodiment, the reaction temperature is maintained at approximately 25 to 27° C. In another embodiment, the reaction temperature is maintained at approximately 20 to 25° C.

In one embodiment, the reaction mixture is heated to approximately 35-40° C. and let stand to separate to an organic phase and an aqueous phase.

In one embodiment, the process further comprises discarding the aqueous phase, heating the organic phase to 45-50° C., and then filtering the organic phase at 45-50° C.

In another embodiment, the process further comprises discarding the aqueous phase, heating the organic phase to 55-60° C., and then filtering the organic phase at 55-60° C.

In another embodiment, the process further comprises cooling the organic phase to 20-25° C. and adding water to the organic phase to create a second mixture, wherein the volume of water added is approximately 1.5 to approximately 2.5 times the volume of the organic phase. In another embodiment, the process further comprises adding water to the organic phase to create a second mixture while maintaining a temperature of 50-55° C.

In one embodiment, the water is added to the organic phase over a period of at least one hour. In another embodiment, the water is added to the organic phase over a period of approximately 4 to 4.5 hours.

In one embodiment, the second mixture is stirred for at least 12 hours, and the product is a solid. In another embodiment, the second mixture is stirred for at least 2 hours.

In one embodiment, LG is Cl.

In one embodiment, the process further comprises reacting a compound of Formula IV

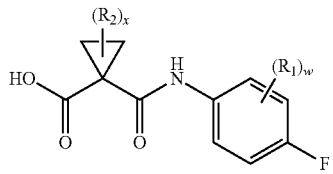

Formula IV with reagent selected from the group consisting of thionyl chloride and oxalyl chloride to produce a compound of Formula III

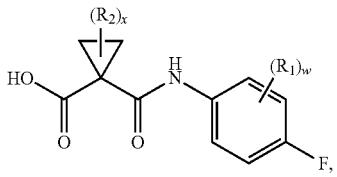

Formula III wherein LG is chloride.

In one embodiment, the reagent is oxalyl chloride.

In another embodiment, the reaction is performed in the presence of a catalytic amount of dimethylformamide.

In another embodiment, the reaction is performed in the presence of an organic solvent. In a further embodiment, the organic solvent a polar aprotic solvent. In a further embodiment, the polar aprotic solvent is tetrahydrofuran.

In one embodiment, the reaction is performed at a temperature that is between approximately −5° C. and 25° C. In a further embodiment, the reaction is performed at a temperature of approximately 0° C. and 20° C. In a further embodiment, the reaction is performed at a temperature of approximately 15° C. or less. In a further embodiment, the reaction is performed at a temperature that is approximately 5-15° C. In a further embodiment, the reaction is performed at a temperature that is approximately 10-15° C. In a further embodiment, the reaction is performed at a temperature that is approximately 10-15° C. for 2-3 hours.

In one embodiment, the process further comprises reacting a compound of Formula V

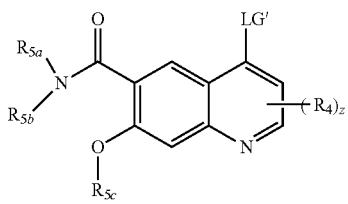

Formula V with a compound of Formula VI

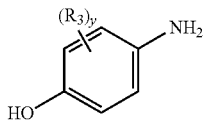

Formula IV to provide a compound of Formula II

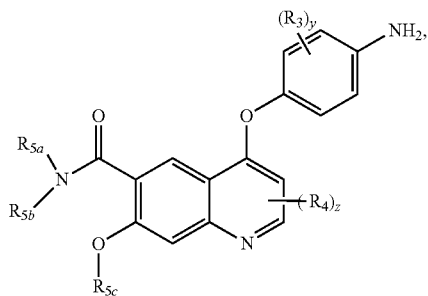

Formula II wherein LG' is selected from F, Cl, Br, I,

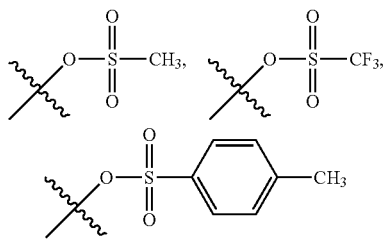

and —$N_2^+$.

In one embodiment, the reaction is performed in the presence of a solvent. In another embodiment, the solvent is an organic solvent. In another embodiment, the solvent is a polar aprotic solvent. In another embodiment, the organic solvent is a polar aprotic solvent selected from acetone, acetonitrile, dimethylsulfoxide, dimethylformamide, dimethylacetamide, hexamethylphosphoric triamde (HMPT), tetrahydrofuran, 1,4-dioxane, and dichloromethane. In a further embodiment, the organic solvent is dimethylacetamide.

In one embodiment, the reaction is performed in the presence of a base. In another embodiment, the base is n-BuLi, lithium diisopropyl amide, lithium hexamethyldisilazide, sodium hexamethyldisilazide, sodium hydroxide, sodium methoxide, sodium t-butoxide, sodium t-pentoxide, lithium hydroxide, lithium methoxide, lithium t-butoxide, lithium t-pentoxide, potassium hydroxide, potassium methoxide, potassium t-butoxide, potassium t-pentoxide, cesium hydroxide, cesium methoxide, cesium t-butoxide, or cesium t-pentoxide. In a further embodiment, the base is sodium t-pentoxide.

In one embodiment, the reaction is performed at a temperature of from about 70 to 90° C. In another embodiment, the reaction is performed at a temperature of from about 75-80° C.

In one embodiment, the product is isolated by adding water to the reaction mixture and isolating the solid product by filtration or the like.

In one embodiment, LG' is selected from F, Cl, Br, and

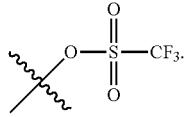

In a further embodiment, LG' is Cl.

In some embodiments, the compound of Formula I is a compound of Formula Ia, Formula Ib, Formula Ic, or Formula Id:

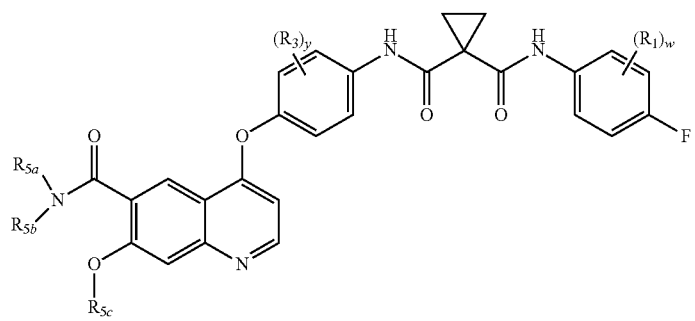

Formula Ia

Formula Ib

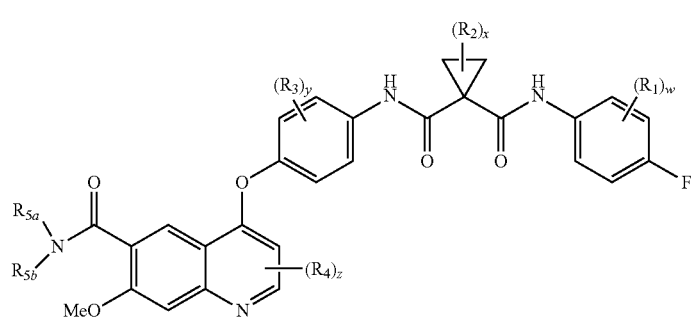

Formula Ic

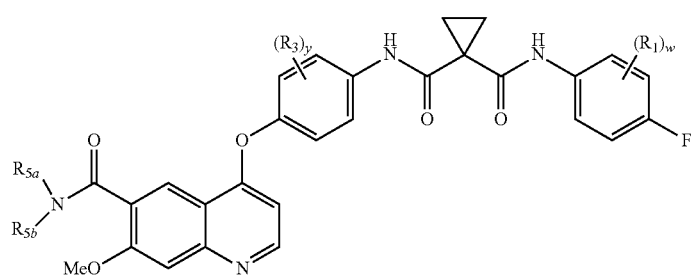

Formula Id

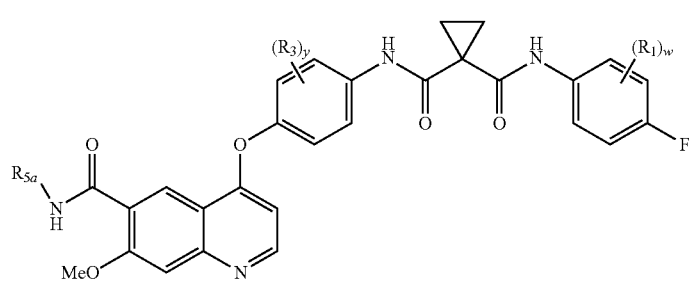

wherein $R_1$, $R_2$, $R_3$, $R_4$, $R_{5a}$, $R_{5b}$, $R_{5c}$, w, x, y, and z as are defined herein.

In one embodiment of formula Ia, Ib, Ic, or Id, $R_1$ is selected from halo, methyl, methoxy, isopropoxy, and cyclopropyl. In one embodiment, w is 0, 1, or 2. In a further embodiment, w is 0.

In one embodiment of formula Ia, Ib, Ic, or Id, x is 0.

In another embodiment of formula Ia, Ib, Ic, or Id, $R_3$ is F or Cl. In one embodiment, y is 0, 1, or 2. In a further embodiment, y is 0.

In one embodiment of formula Ia, Ib, Ic, or Id, $R_4$ is halo or $C_{1-6}$ alkyl. In one embodiment, z is 0 or 1. In a further embodiment, z is 0.

In one embodiment of formula Ia, Ib, Ic, or Id, $R_{5b}$ is H.

In one embodiment of formula Ia, Ib, Ic, or Id, $R_{5a}$ is selected from H, —$NH_2$, —OH, $C_{1-6}$ alkyl, and $C_{3-6}$ heterocycloalkyl, wherein the up to three methylene units of the $C_{1-6}$ alkyl are optionally and independently replaced with —O— or NR'—, wherein $R_{5a}$ is optionally substituted with up to three substituents selected from OH, $C_{1-4}$ alkyl, and $C_{3-6}$ heterocycloalkyl.

In a further embodiment of formula Ia, Ib, Ic, or Id, $R_{5a}$ is selected from H, —$NH_2$, —OH, methoxy, methyl, ethyl, N-methylazetidine-2-yl, pyrrolidine-2-yl-methyl, oxetane-2-yl-oxy, 2-hydroxyethyloxy, 2,3-dihydroxypropyloxy, oxetane-2-yl, 2-(N-piperidyl)ethyl, 2-(N-morpholino)ethyl, and 2-dimethylaminoethyl. In still a further embodiment, $R_{5a}$ is methyl.

In one embodiment of formula Ia, Ib, Ic, or Id, $R_{5c}$ is H or $C_{1-6}$ alkyl optionally substituted with OH or OR'. In a further embodiment, $R_{5c}$ is methyl, 2-hydroxyethyl, 2-methoxyethyl, or 2-hydroxypropyl. In still a further embodiment, $R_{5c}$ is methyl.

In another embodiment of formula Ia, Ib, Ic, or Id, $R_{5a}$ and $R_{5b}$ together with the nitrogen to which they are attached form a $C_{3-6}$ heterocycloalkyl optionally substituted with OH. In a further embodiment, $R_{5a}$ and $R_{5b}$ together with the nitrogen to which they are attached form azetidine or 2-hydroxyazetidine.

In one embodiment of formula Ia, Ib, Ic, or Id, R' is H. In another embodiment, R' is $C_{1-6}$ alkyl. In some embodiments, R' is selected from H, methyl, ethyl, propyl, isopropyl, butyl, t-butyl, and pentyl. In one embodiment, R' is H or methyl. In one embodiment, R' is methyl.

In one aspect, the invention includes a process for the preparation of Compound 1

Compound 1

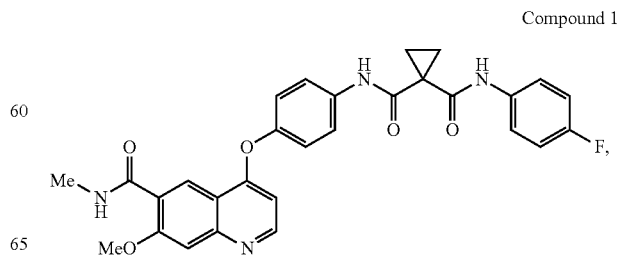

or a pharmaceutically acceptable salt thereof, comprising contacting Compound 4

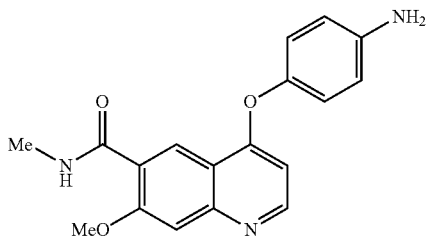

with a compound of Formula III'

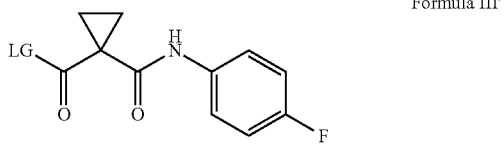

in the presence of a solvent and a base, wherein LG is a leaving group selected from Cl, Br, I, HOAt, HOBt, and an organotriphosphate compound, and wherein the process optionally further comprises contacting the compound of Compound 1 with an acid to produce a pharmaceutically acceptable salt of the compound of Compound 1.

In one embodiment, the base is an inorganic base. In a further embodiment, the base is selected from NaOH, $Na_2CO_3$, $K_2CO_3$, $NaHCO_3$, and $KHCO_3$. In still a further embodiment, the base is $Na_2CO_3$. In still a further embodiment, the base is $K_2CO_3$.

In one embodiment, the solvent is a mixture of water and an organic solvent. In one embodiment, the organic solvent is a polar protic or polar aprotic solvent. In one embodiment, the polar protic or polar aprotic solvent is selected from acetone, acetonitrile, butanediol, dimethylformamide, dimethyl sulfoxide, dimethoxyethane, dimethyl sulfoxide, 1,4-dioxane, ethanol, ethylene glycol, furfuryl alcohol, glycerol, methanol, methyl isocyanide, N-methyl-2-pyrrolidone, 1-propanol, 1,3-propanediol, 1,5-pentanediol, 2-propanol, propylene glycol, tetrahydrofuran, and triethylene glycol. In another embodiment, the organic solvent is selected from acetone, acetonitrile, dimethylformamide, 1,4-dioxane, and tetrahydrofuran. In a further embodiment, the solvent is a mixture of water and tetrahydrofuran. In still a further embodiment, the mixture is from approximately 2:1 tetrahydrofuran:water to approximately 3:1 tetrahydrofuran:water.

In one embodiment, Compound 4 is contacted with the compound of Formula III' by adding a solution of a compound of Formula III' dissolved in a first solvent to a solution of Compound 4 dissolved in a second solvent, to create a reaction mixture.

In one embodiment, the first solvent is an organic solvent. In a further embodiment, the first solvent is a polar aprotic solvent. In a further embodiment, the first solvent is tetrahydrofuran.

In one embodiment, the second solvent is approximately 2:1 tetrahydrofuran:water.

In one embodiment, the compound of Formula III' dissolved in a first solvent is added to a solution of Compound 4 dissolved in a second solvent over a period of approximately 30 minutes to approximately 1 hour. In another embodiment, the compound of Formula III' dissolved in a first solvent is added to a solution of Compound 4 dissolved in a second solvent over a period of no less than 30 minutes.

In one embodiment, the temperature of the reaction mixture is maintained at between approximately 20 to 27° C. In one embodiment, the reaction mixture is maintained at between approximately 25 to 27° C. In one embodiment, the reaction mixture is maintained at below approximately 27° C. In another embodiment, the reaction temperature is maintained at approximately 20 to 25° C.

In another embodiment, the reaction mixture is heated to 35-40° C. and let stand to separate to an organic phase and an aqueous phase.

In one embodiment, the process further comprises discarding the aqueous phase, heating the organic phase to 45-50° C., and then filtering the organic phase at 45-50° C.

In one embodiment, the process further comprises discarding the aqueous phase, heating the organic phase to 55-60° C., and then filtering the organic phase at 55-60° C.

In another embodiment, the process further comprises cooling the organic phase to 20-25° C. and adding water to the organic phase to create a second mixture, wherein the volume of water added is approximately 1.5 to approximately 2.5 times the volume of the organic phase.

In another embodiment, the process further comprises adding water to the organic phase to create a second mixture while maintaining a temperature of 50-55° C.

In one embodiment, the water is added to the organic phase over a period of at least one hour. In another embodiment, the water is added to the organic phase over a period of approximately 4 to 4.5 hours.

In one embodiment, the second mixture is stirred for at least 12 hours, and the product is a solid, which is collected by filtration or the like. In another embodiment, the second mixture is stirred for at least 2 hours, and the product was collected by filtration or the like.

In one embodiment, LG is Cl.

In one embodiment, the process further comprises reacting Compound 6

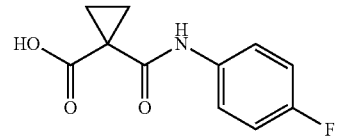

with a reagent selected from the group consisting of thionyl chloride and oxalyl chloride to produce Compound 7

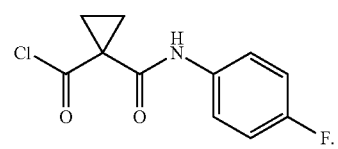

In one embodiment, the reagent is oxalyl chloride.

In another embodiment, the reaction is performed in the presence of a catalytic amount of dimethylformamide.

In one embodiment, the reaction is performed in the presence of an organic solvent. In a further embodiment, the organic solvent is tetrahydrofuran.

In one embodiment, the reaction is performed at a temperature that is 15° C. or less. In a further embodiment, the reaction is performed at a temperature that is 5-15° C. In a further embodiment, the reaction is performed at a temperature that is approximately 10-15° C. In a further embodiment, the reaction is performed at a temperature that is approximately 10-15° C. for 2-3 hours.

In one embodiment, the process further comprises reacting Compound 3

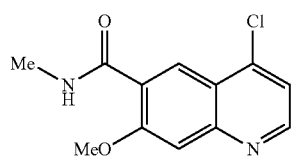

with 4-aminophenol (5) to provide Compound 4

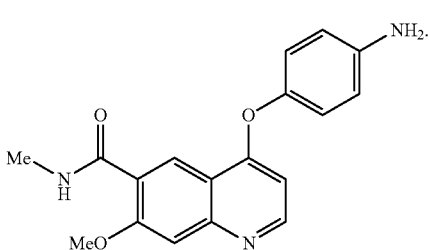

In one embodiment, the reaction is performed in the presence of a solvent. In a further embodiment, the solvent is an organic solvent. In a further embodiment, the organic solvent is selected from acetone, acetonitrile, dimethylsulfoxide, dimethylformamide, dimethylacetamide, hexamethylphosphoric triamde (HMPT), tetrahydrofuran, 1,4-dioxane, and dichloromethane. In still a further embodiment, the organic solvent is dimethylacetamide.

In one embodiment, the reaction is performed in the presence of a base. In a further embodiment, the base is n-BuLi, lithium diisopropyl amide, lithium hexamethyldisilazide, sodium hexamethyldisilazide, sodium hydroxide, sodium methoxide, sodium t-butoxide, sodium t-pentoxide, lithium hydroxide, lithium methoxide, lithium t-butoxide, lithium t-pentoxide, potassium hydroxide, potassium methoxide, potassium t-butoxide, potassium t-pentoxide, cesium hydroxide, cesium methoxide, cesium t-butoxide, or cesium t-pentoxide.

In one embodiment, the reaction is performed at a temperature of 75-80° C.

In one embodiment, the product is isolated by adding water to the reaction mixture and isolating the solid product.

In one embodiment, the process further comprises reacting Compound 1 with fumaric acid to provide Compound 1-hemifumarate

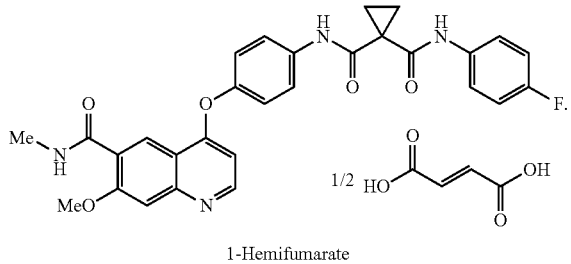 [SMILES: CNC(=O)c1cc2c(Oc3ccc(NC(=O)C4(C(=O)Nc5ccc(F)cc5)CC4)cc3)ccnc2cc1OC ; O=C(O)/C=C/C(=O)O]

1-Hemifumarate

In one embodiment, the reaction is performed in the presence of a solvent. In a further embodiment, the solvent is selected from water, an alcoholic solvent, THF, DMF, MEK, acetonitrile, 1,4-dioxane, and MTBE, or any combination thereof. In a further embodiment, the solvent is a mixture of water in an alcoholic solvent.

In one embodiment, the alcoholic solvent is selected from methanol, ethanol, n-propanol, isopropanol, n-butanol, t-butanol, pentanol, hexanol, heptanol, and octanol.

In a further embodiment, the solvent is a 20% solution of water in ethanol.

In one embodiment, the volume of the 20% solution of water in ethanol used in the reaction is about 2-3 time the weight of Compound 1. In another embodiment, the volume (mL) of the 20% solution of water in ethanol used in the reaction is about 3 time the weight (gram) of Compound 1.

In one embodiment, the quantity of fumaric acid used is about 0.5-1.0 equivalents with respect to Compound 1. In another embodiment, the quantity of fumaric acid used is about 0.75-1.0 equivalents with respect to Compound 1. In another embodiment, the quantity of fumaric acid used is about 0.8-0.82 equivalents with respect to Compound 1.

In one embodiment, Compound 1 is reacted with fumaric acid by adding a mixture of fumaric acid dissolved in a 20% solution of water in ethanol at 45-50° C. to Compound 1 to create a reaction mixture.

In one embodiment, the volume (mL) of the 20% solution of water in ethanol used for dissolving fumaric acid is about 2-3 times the weight (gram) of Compound 1. In another embodiment, the volume of the 20% solution of water in ethanol used for dissolving fumaric acid is about 2.2-2.8 times the weight of Compound 1. In another embodiment, the volume of the 20% solution of water in ethanol used for dissolving fumaric acid is about 2.4-2.6 times the weight of Compound 1.

In one embodiment, the process further comprises heating the reaction mixture to reflux temperature and stirring. In another embodiment, the refluxing reaction mixture is stirred for 4-6 hours.

In one embodiment, the process further comprises cooling the reaction mixture and separating the solid product from the solvent.

In another aspect, the invention includes a process for the preparation of Compound 1

1

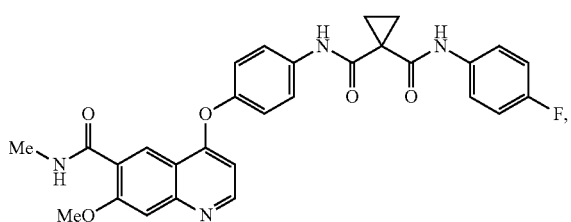

or a pharmaceutically acceptable salt thereof, comprising:
reacting Compound 3

3

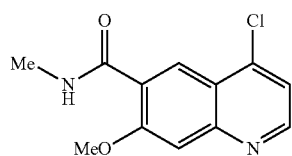

with 4-aminophenol (5) to provide Compound 4

4

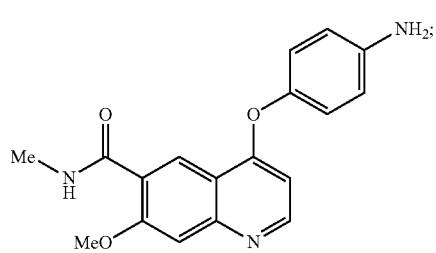

reacting Compound 6

6

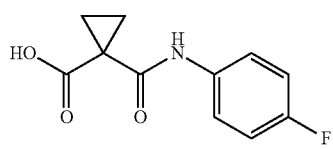

with thionyl chloride or oxalyl chloride in the presence of a solvent to produce Compound 7,

7

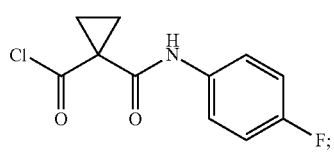

reacting Compound 4 and Compound 7 to produce Compound 1,
wherein the process optionally further comprises contacting Compound 1 with an acid to produce a pharmaceutically acceptable salt of the compound of Compound 1.

In another aspect, the invention includes a process for the preparation of Compound 1

1

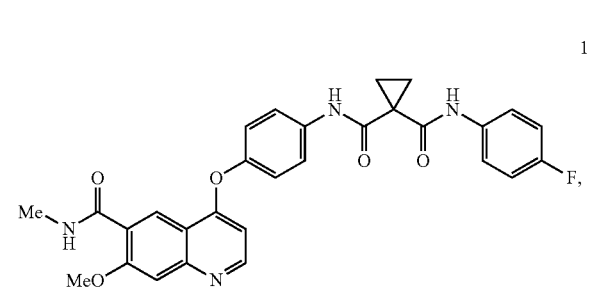 [SMILES: CNC(=O)c1cc2c(Oc3ccc(NC(=O)C4(C(=O)Nc5ccc(F)cc5)CC4)cc3)ccnc2cc1OC]

or a pharmaceutically acceptable salt thereof, comprising:
reacting Compound 3

3

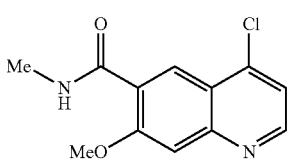

with 4-aminophenol (5) in the presence of a solvent that is dimethylacetamide and a base that is sodium t-pentoxide, at a temperature that is from 75 to 80° C., to provide a first reaction mixture that comprises Compound 4

4

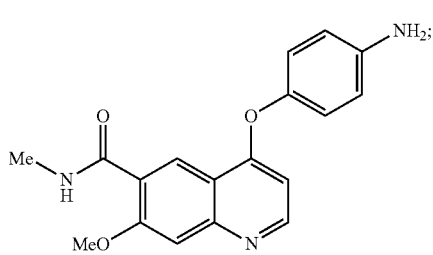

precipitating and isolating the solid product Compound 4 by adding water to the first reaction mixture;
reacting Compound 6

6

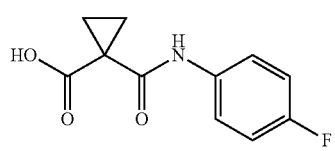

with oxalyl chloride in the presence of a solvent that is tetrahydrofuran and a catalyst that is dimethylformamide at a temperature that is from 5 to 15° C. to produce a second reaction mixture that comprises Compound 7,

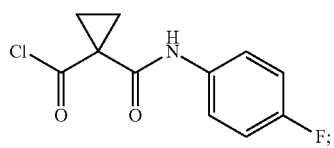

adding the second reaction mixture to a third reaction mixture comprising a solvent that is approximately 2:1 tetrahydrofuran:water, a base that is $Na_2CO_3$ or $K_2CO_3$ (preferably $K_2CO_3$) and Compound 4, over a period of at least 30 minutes, to create a fourth reaction mixture wherein the temperature of the fourth reaction mixture is maintained below approximately 27° C. during the addition;

heating the fourth reaction mixture to 35-40° C. and letting stand to separate to an organic phase and an aqueous phase;

discarding the aqueous phase, heating the organic phase to 55-60° C., and then filtering the organic phase at 55-60° C.;

adding water to the organic phase over a period of approximately 4 to 4.5 hours to create a fifth reaction mixture while maintaining a temperature of 50-55° C.;

stirring the fifth reaction mixture for at least 2 hours; and isolating the solid product that is Compound 1, and wherein the process optionally further comprises contacting Compound 1 with an acid to produce a pharmaceutically acceptable salt of the compound of Compound 1.

In one embodiment of this aspect, the dimethylformamide is present in a catalytic amount.

In some embodiments of this aspect, the mole ratio between dimethylformamide and oxalyl chloride is about 0.001, 0.002, 0.003, 0.004, 0.005, 0.006, 0.007, 0.008, 0.009, 0.01, 0.02, 0.03, 0.04 or 0.05. In some embodiments, the volume ratio between dimethylformamide and oxalyl chloride is about 0.001, 0.002, 0.003, 0.004, 0.005, 0.006, 0.007, 0.008, 0.009, 0.01, 0.02, 0.03, 0.04 or 0.05. In some embodiments, the mole ratio of dimethylformamide/oxalyl chloride is between about 0.001 to about 0.005. In some embodiments, the volume ratio of dimethylformamide/oxalyl chloride is between about 0.001 to about 0.005.

In other embodiments of this aspect, the mole ratio between dimethylformamide and Compound 6 is about 0.001, 0.002, 0.003, 0.004, 0.005, 0.006, 0.007, 0.008, 0.009, 0.01, 0.02, 0.03, 0.04 or 0.05. In some embodiments, the volume ratio between dimethylformamide and Compound 6 is about 0.001, 0.002, 0.003, 0.004, 0.005, 0.006, 0.007, 0.008, 0.009, 0.01, 0.02, 0.03, 0.04 or 0.05. In some embodiments, the mole ratio of dimethylformamide/Compound 6 is between about 0.001 to about 0.005. In some embodiments, the volume ratio of dimethylformamide/Compound 6 is between about 0.001 to about 0.005.

In another aspect, the invention includes a process for the preparation of Compound 1-hemifumarate

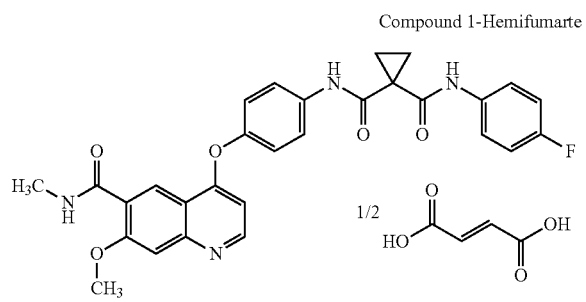 [SMILES: CNC(=O)c1cc2c(Oc3ccc(NC(=O)C4(C(=O)Nc5ccc(F)cc5)CC4)cc3)ccnc2cc1OC ; O=C(O)/C=C/C(=O)O]

comprising:

adding a mixture of fumaric acid dissolved in a 20% solution of water in ethanol at 45-50° C. to Compound 1 to create a reaction mixture;

heating the reaction mixture to reflux;

stirring the reaction mixture at reflux for 4-6 hours; and cooling the reaction mixture and separating the solid product that is Compound 1·hemifumarate from the solvent.

In another aspect, the invention includes a process for the preparation of Compound 1-hemifumarate

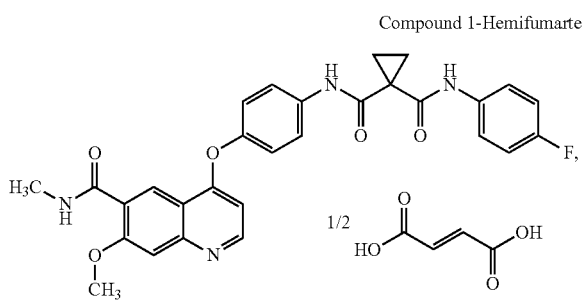 [SMILES: CNC(=O)c1cc2c(Oc3ccc(NC(=O)C4(C(=O)Nc5ccc(F)cc5)CC4)cc3)ccnc2cc1OC ; O=C(O)/C=C/C(=O)O]

comprising:
reacting Compound 3

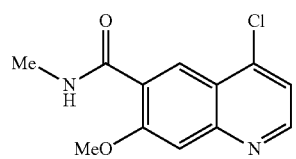

with 4-aminophenol (5) to provide Compound 4

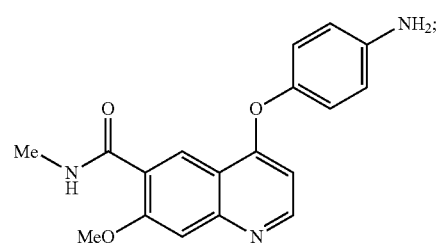

reacting Compound 6

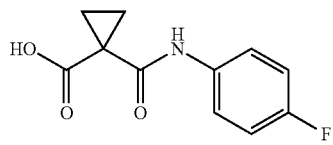

6 with thionyl chloride or oxalyl chloride in the presence of a solvent to produce Compound 7,

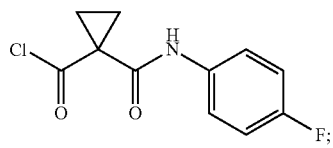

7 reacting Compound 4 and Compound 7 to produce Compound 1; and
combining fumaric acid dissolved in a 20% solution of water in ethanol with Compound 1 to provide Compound 1-hemifumarate.

In one embodiment, Compound 1 is reacted with fumaric acid by adding a mixture of fumaric acid dissolved in a 20% solution of water in ethanol at 45-50° C. to Compound 1 to create a slurry.

In one embodiment, the quantity of fumaric acid used is about 0.5-1.0 equivalents with respect to Compound 1. In another embodiment, the quantity of fumaric acid used is about 0.75-1.0 equivalents with respect to Compound 1. In another embodiment, the quantity of fumaric acid used is about 0.8-0.82 equivalents with respect to Compound 1.

In one embodiment, the volume (mL) of the 20% solution of water in ethanol used for dissolving fumaric acid is about 2-3 times the weight (gram) of Compound 1. In another embodiment, the volume of the 20% solution of water in ethanol used for dissolving fumaric acid is about 2.2-2.8 times the weight of Compound 1. In another embodiment, the volume of the 20% solution of water in ethanol used for dissolving fumaric acid is about 2.4-2.6 times the weight of Compound 1.

In another aspect, the invention includes a process for preparing Compound 1-hemifumarate

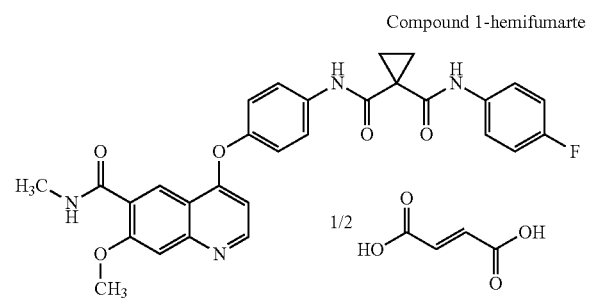 [SMILES: CNC(=O)c1cc2c(Oc3ccc(NC(=O)C4(C(=O)Nc5ccc(F)cc5)CC4)cc3)ccnc2cc1OC ; O=C(O)/C=C/C(=O)O]

Compound 1-hemifumarte comprising:
combining a fumaric acid solution with Compound 1 to generate a reaction mixture comprising a slurry;
heating the reaction mixture to reflux for a predetermined amount of time; and isolating Compound 1·hemifumarate as a solid.

In one embodiment of this aspect, combining comprises adding the fumaric solution to Compound 1.

In a further embodiment, the fumaric acid is dissolved in a mixed solvent of EtOH and acetone at about 45-50° C. to form the solution.

In another embodiment, the predetermined amount of time is between about 1 and 6 hours.

In another embodiment, isolating comprises cooling the reaction mixture comprising the slurry; filtering the reaction mixture to obtain a solid; and washing the solid.

In one aspect, the invention includes a Compound having the structure:

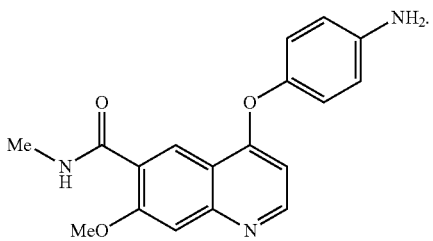 [SMILES: CNC(=O)c1cc2c(Oc3ccc(N)cc3)ccnc2cc1OC]

Discussion

The synthetic conversion to produce Compound 1 comprises two parallel reactions: the generation of the acid chloride Compound 7 and the amidation reaction to produce Compound 1. The generation of acid chloride 7 was discovered to be fast and complete after approximately 15 minutes when carried out at ambient temperature. However, at ambient temperature, batch-to-batch inconsistency was observed, and some batches contained higher levels of impurities than others. It was further discovered that the production of unwanted side products was avoided by proceeding with the reaction at 10-15° C. At this temperature, the reaction was slower and generally took 2-3 hours to complete, but impurity levels could be controlled and minimized.

During the amidation reaction to produce Compound 1, the major impurities were found to be unreacted Compound 4 and various reaction products due to side reactions with the acid chloride. It was found that using slightly less than a stoichiometric amount of the acid chloride in the reaction greatly reduced the amount of impurities from acid chloride side reactions.

As provided herein, Compound 1 is reacted with fumaric acid to produce Compound 1-Hemifumarate. Due to the low solubility of the hemifumarate salt, the polish filtration that would typically be done at the API stage to remove any foreign matter was performed at the freebase step. As such, a high volume of solvent (50 v/w with respect to Compound 4) was used. Even with this high volume, product precipitation during the aqueous phase removal in the scale up was observed. To solve the problem, the organic phase was heated to 55-60° C. and then polish filtered.

The salt formation of Compound 1·hemifumarate was previously performed in a mixture of THF and water. After polish filtration, THF was exchanged to IPA. It was found, however, that the crystalline product still contained a high level of THF. Attempts to remove THF with hot trituration in solvents and vacuum drying at high temperature were unsuccessful. In an attempt to correct this problem, MEK and IPA were each used as the solvent for the salt formation.

These attempts were not successful, as MEK and IPA replaced THF in the crystal lattice forming the respective solvates.

It was realized that when the salt was formed in solution, a solvate resulted where THF was incorporated into the crystalline product and could not be removed by drying under vacuum, even at 60-80° C. An attempt to remove residual THF by suspending the salt in refluxing IPA was also unsuccessful.

Our studies suggested that the salt could be formed from a slurry of the free base of Compound 1. It was further discovered that the suspension salt formation could be carried out using ACN, IPA or EtOH as long as the reaction temperature was above 70° C. The conversion under these slurry conditions was slow (>10 hours), likely due to the low solubility of the free base in the media. The benefit of the suspension reaction was that the crystalline product contained minimum amount of solvent (solvate formation was not observed). The conversion of freebase to hemifumarate was monitored using $^1$H NMR ($d_6$ DMSO) by observing the integration ratio of the fumaric acid peak at δ 6.64 ppm (corresponding to 2 protons) compared to the aromatic peak of Compound 1 at δ 6.47 ppm (corresponding to 1 proton). The complete conversion would show a 1:1 ratio of these two signals.

It was found that in the presence of water in EtOH, the conversion was faster. Thus, in an alternative example, the reaction in a 10% water in EtOH solution was complete after 5 hours at 62-65° C. The yields obtained were moderate, but a higher yield was generally obtained when solvent volumes were reduced. However, a high volume of solvent was needed to dissolve the fumaric acid to enable a polish filtration at ambient temperature. In order to reduce the reaction volume, the quantity of fumaric acid used was reduced to 0.8-0.82 equivalents with respect to Compound 1. A higher temperature was also used to dissolve the fumaric acid (40-45° C.), which enabled the acid to dissolve with 2.48 vol. of 20% water in EtOH with respect to compound 1. Thus, it was surprising to find out that by using 20% water in EtOH in a volume of 2-3 times (or 2.2-2.8 times, or 2.4-2.6 times) the weight of Compound 1 for dissolving Compound 1, the yield of Compound 1·hemifumarate has greatly improved from about 58% (by using pure ethanol) to >95% (97%) with the purity of the product greater than 99% by UPLC. No solvate formation was observed. The table below summarizes the solvents used for dissolving fumaric acid and the corresponding yields.

| Solvent | Yield |
| --- | --- |
| Solvent: 100% ethanol<br>Volume of solvent (mL) :<br>weight of Compound 1 (g) = 10 | 58% |
| Solvent: 10% water in ethanol<br>Volume of solvent (mL) :<br>weight of Compound 1 (g) = 5 | 60% |
| Solvent: 10% water in ethanol<br>Volume of solvent (mL) :<br>weight of Compound 1 (g) = 7 | 71% |
| Solvent: 20% water in ethanol<br>Volume of solvent (mL) :<br>weight of Compound 1 (g) = 5 | 80% |
| Solvent: 20% water in ethanol<br>Volume of solvent (mL) :<br>weight of Compound 1 (g) = 2.4-2.6 | 97%<br>>99% (Purity) |

The invention will now be demonstrated by the following non-limiting examples.

EXAMPLES

Materials and Sources

| Material | Compound # |
| --- | --- |
| 4-Chloro-7-methoxy-N-methylquinoline-6-carboxamide | 3 |
| 4-Aminophenol | 5 |
| Sodium tert-pentoxide | N/A |
| N,N-dimethylacetamide | N/A |
| Tetrahydrofuran | N/A |
| 1-( 4-Fluorophenylcarbamoyl)-cyclopropanecarboxylic acid | 6 |
| Oxalyl Chloride | N/A |
| DMA | N/A |
| DMF | N/A |
| THF | N/A |
| Potassium carbonate | N/A |
| Fumaric acid | N/A |
| Ethanol | N/A |

Scheme 1: Process for Preparing Compound 1 and Compound 1 Hemifumarate

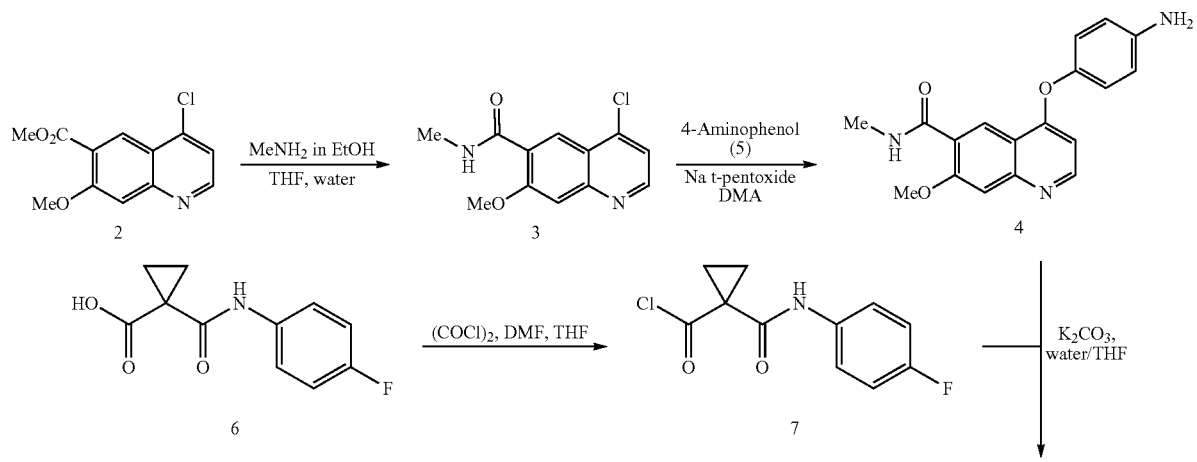

31 32

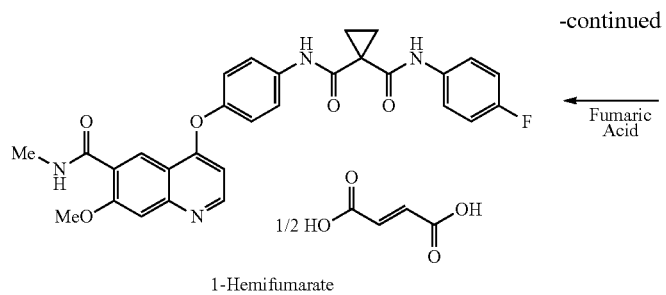

1-Hemifumarate

←—Fumaric Acid—

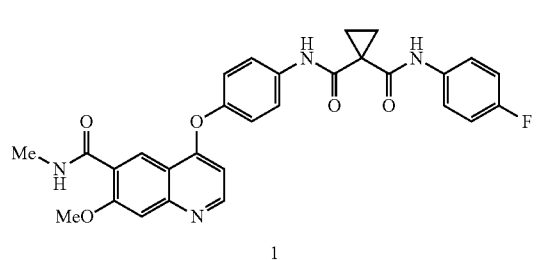

1

Example 1: Synthesis of 4-chloro-7-methoxy-N-methylquinoline-6-carboxamide (3

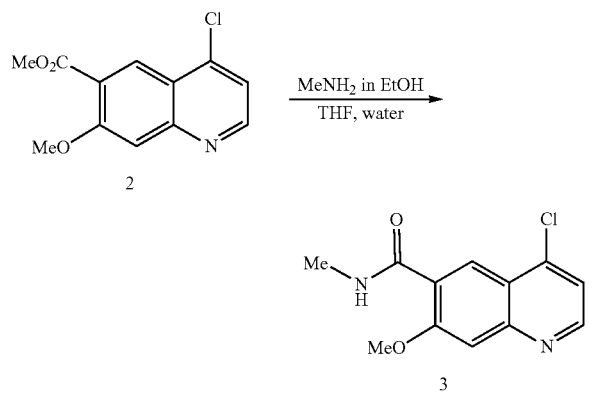

To a suspension of methyl 4-chloro-7-methoxyquinoline-6-carboxylate 2 (2 g, 8 mmol) in THF (20 mL) was added methyl amine in EtOH (33% w/w, 8 M, 20 mL, 160 mmol) and H$_2$O (10 mL). The resulting mixture was stirred at room temperature. The mixture turned into a clear solution in about 10 min and remained as a clear solution during the reaction. The stirring was continued until the starting material was completely consumed as evidenced by LCMS and HPLC. It took about 3 hours. The mixture was then concentrated and the residue was slurried in 20 mL of water, and filtered. Some EtOAc was used to transfer the material from flask to filter funnel. The product was dried to give 4-chloro-7-methoxy-N-methylquinoline carboxamide as white solid (yield 1.8 g, 90%, HPLC purity >97%).

Example 2: Synthesis of 4-(4-aminophenoxy)-7-methoxy-N-methylquinoline-6-carboxamide (4

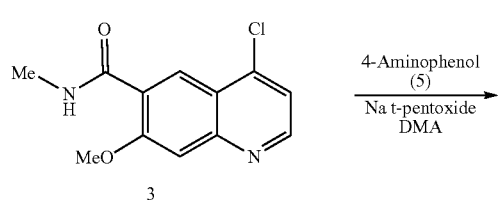

A 5 L, 3-neck round bottom flask equipped with a thermometer, nitrogen inlet, and magnetic stirrer was charged with 4-chloro-7-methoxy-N-methylquinoline-6-carboxamide (3; 300 g; 1 eq.), 4-aminophenol (5; 195.9 g; 1.5 eq.), and DMA (1500 mL). The resulting solution was stirred at room temperature, and a solution of sodium t-pentoxide (184.52 g; 1.4 eq.) dissolved in anhydrous THF (313 mL) was added with stirring over a 5 minute period. The reaction mixture was then heated to 75-80° C. and stirred for an additional 2-6 hours. The reaction mixture was then cooled to room temperature and charged with water (3 L), and stirred at least for an additional 1 hour. The product was filtered and washed twice with 600 mL of 1:1 DMA/water, then once with 1200 mL water. The product was transferred to a crystallizing dish and dried in the vacuum oven at 40-45° C. for a minimum of 18 hours to yield a light brown shiny solid (370-377 g; 96-97%).

Example 3A: Synthesis of 1-((4-fluorophenyl)carbamoyl)cyclopropane-1-carbonyl chloride (7

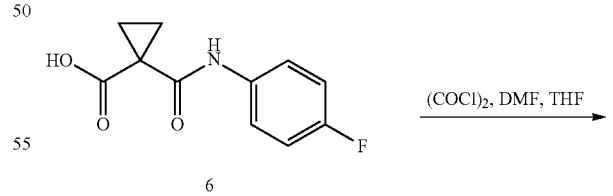

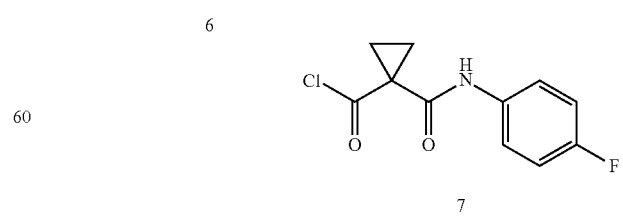

A 250 mL, 3 neck round bottom flask equipped with a thermometer, nitrogen inlet, and magnetic stirrer was charged with 1-((4-fluorophenyl)carbamoyl)cyclopropane-1-carboxylic acid (6, 19.11 g; 1.3 eq.), 75 mL anhydrous THF, and 0.25 mL DMF (catalyst). The mixture was stirred until all solids dissolved, cooled to 5-10° C., and then charged with oxalyl chloride (7.13 mL; 1.28 eq.). The resulting mixture was aged at 10-15° C. for 2-3 hours and reaction completion was confirmed by IPC (in process control). Upon reaction completion, the resulting product mixture was used in the next step without further purification.

Example 3B: Synthesis of 1-((4-fluorophenyl)carbamoyl)cyclopropane-1-carbonyl chloride (7

[Alternative Method]

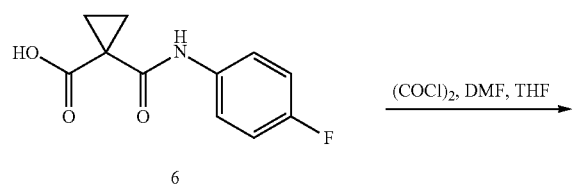

6

(COCl)₂, DMF, THF
⟶

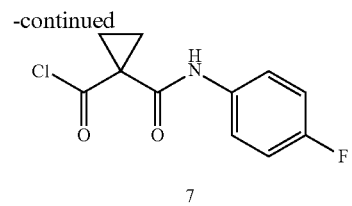

7

A 250 mL, 3 neck round bottom flask equipped with a thermometer, nitrogen inlet, and magnetic stirrer was charged with 1-((4-fluorophenyl)carbamoyl)cyclopropane-1-carboxylic acid (6, 19.11 g; 1.3 eq.), 75 mL anhydrous THF, and 0.25 mL DMF (catalyst). The mixture was stirred until all solids dissolved, cooled to 5-15° C., and then charged with oxalyl chloride (7.13 mL; 1.28 eq.). The resulting mixture was warmed to room temperature and then stirred for 2-4 hours. The resulting product mixture was used in the next step without further purification.

Example 4A: Synthesis of N-(4-fluorophenyl)-N-(4-((7-methoxy-6-(methylcarbamoyl)quinolin-4-yl)oxy)phenyl)cyclopropane-1,1-dicarboxamide (1

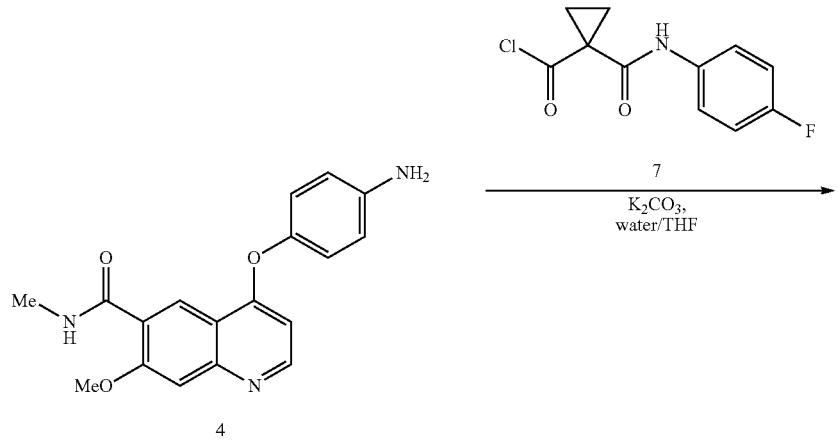

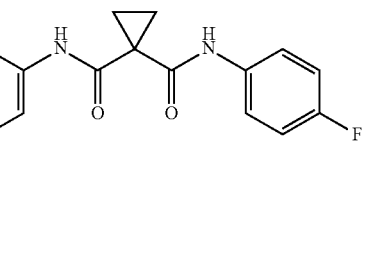

1

A 500 mL, 3 neck round bottom flask equipped with a thermometer, nitrogen inlet, and magnetic stirrer was charged with 4-(4-aminophenoxy)-7-methoxy-N-methylquinoline-6-carboxamide (4, 21.3 g; 1.0 eq.), 210 mL anhydrous THF, and a solution composed of potassium carbonate (27.32 g; 3 eq) and 100 mL water. The added aqueous $K_2CO_3$ solution was rinsed forward with an additional 6.4 mL water. With vigorous agitation, the reaction mixture containing Compound 7 from the previous example was transferred to the present reaction mixture over a period of no less than 30 minutes while maintaining an internal temperature between 20 and 25° C. The transfer equipment was rinsed with 32 mL of anhydrous THF. The reaction mixture was agitated at ambient temperature for 0.5-1 hour. The resulting mixture was warmed to 35-40° C. and the phases were allowed to separate. The lower aqueous layer was discarded and the top organic phase was warmed to 55-60° C. and then polish filtered and rinsed with 21 mL of THF. The filtered organic phase was transferred to a 1 L, 3 neck round bottom flask equipped with thermometer, nitrogen inlet, and mechanical stirring and charged, with water at 55-60° C. The resulting solution was seeded with Compound 1 and to the resulting seed bed, water was added as an anti-solvent over 4-4.5 hours while maintaining a temperature of 50-55° C. The resulting slurry was cooled to 20-25° C. and aged for no less than 2 hours. The product was then filtered, washed with water/THF and dried.

Example 4B: Synthesis of N-(4-fluorophenyl)-N-(4-((7-methoxy-6-(methylcarbamoyl)quinolin-4-yl)oxy)phenyl)cyclopropane-1,1-dicarboxamide (1

[Alternative Method]

A 500 mL, 3 neck round bottom flask equipped with a thermometer, nitrogen inlet, and magnetic stirrer was charged with 4-(4-aminophenoxy)-7-methoxy-N-methylquinoline-6-carboxamide (4, 21.3 g; 1.0 eq.), 210 mL anhydrous THF, and a solution composed of potassium carbonate (27.32 g; 3 eq) and 100 mL water. The added aqueous $K_2CO_3$ solution was rinsed forward with an additional 6.4 mL water. With vigorous agitation, the reaction mixture containing Compound 7 from the previous example was transferred to the present reaction mixture over a period of 0.5-1 hour while maintaining an internal temperature below 27° C. The transfer equipment was rinsed with 32 mL of anhydrous THF. The reaction mixture was agitated at ambient temperature for 0.5-1 hour. The resulting mixture was warmed to 35-40° C. and the phases was allowed to separate. The lower aqueous layer was discarded and the top organic phase was warmed to 45-50° C. and then filtered through a filter paper and rinsed with 21 mL of THF. The filtered organic phase was transferred to a 1 L, 3 neck round bottom flask equipped with thermometer, nitrogen inlet, and mechanical stirring and charged, over a minimum of 1 hour with 694 mL of filtered water. The resulting mixture was stirred at 20-25° C. for a minimum of 12 hours, and the product was then filtered and rinsed twice with 42 mL of a 2:1 water:THF mixture. The product was then dried on a filter paper at room temperature or in a vacuum oven at 40-45° C. to yield a white to beige solid (31.36 g; 90%).

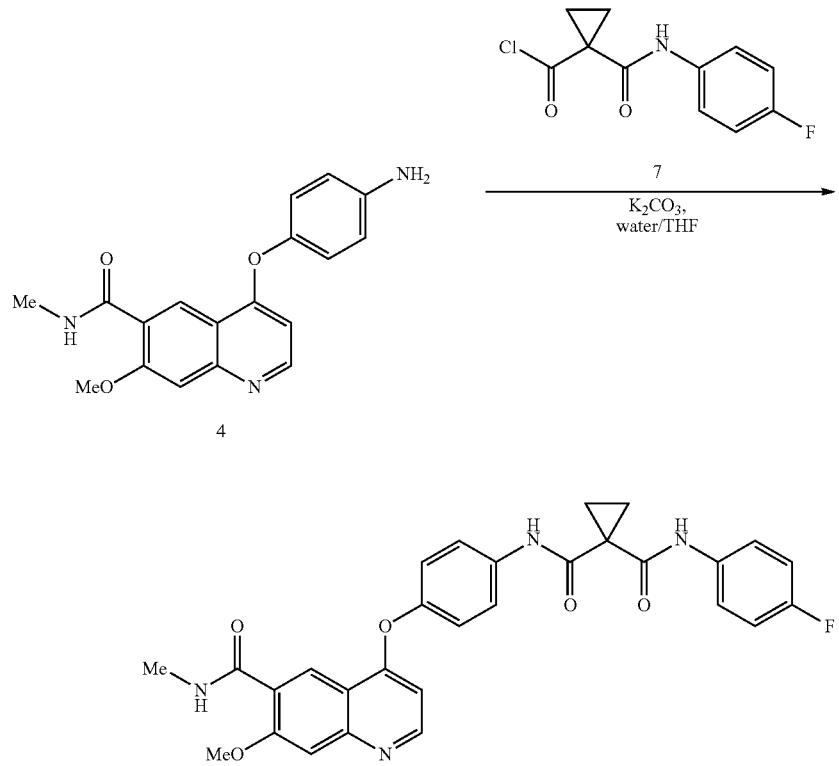

Example 5: Synthesis of N-(4-fluorophenyl)-N-(4-((7-methoxy-6-(methylcarbamoyl)quinolin-4-yl)oxy)phenyl)cyclopropane-1,1-dicarboxamide·½ fumaric acid (1·hemifumarate)—Method 1

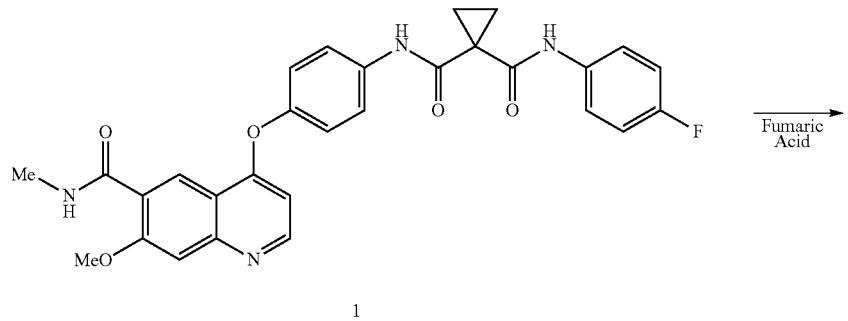

1

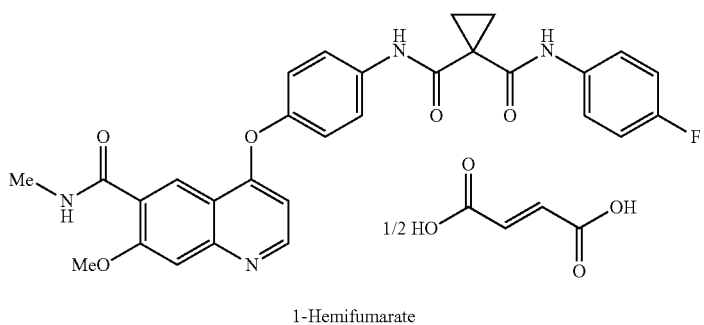

1-Hemifumarate

A 2000 mL, 3 neck round bottom flask equipped with a thermometer, nitrogen inlet, and magnetic stirrer was charged with fumaric acid (80 g; 0.82 eq.) and 1.2 L of a 20% solution of water in ethanol. The mixture was heated to 45-50° C. and stirred until all solids were dissolved. To a separate 3 L, 3 neck round bottom flask equipped with thermometer, nitrogen inlet, and mechanical stirrer was charged N-(4-fluorophenyl)-N-(4-((7-methoxy-6-(methylcarbamoyl)quinolin-4-yl)oxy)phenyl)cyclopropane-1,1-dicarboxamide (1, 500 g; 1.0 eq.). The fumaric acid solution was clarified through a filter paper at 40-45° C., and transferred, at 40-45° C., to the flask with Compound 1. The 2000 mL round bottom flask was rinsed forward with 300 mL of a 20% solution of water in ethanol at 45-50° C. The resulting mixture was heated to reflux (75-80° C.) and stirred for 4-6 hours. The reaction mixture was then cooled to room temperature, and the product was filtered and the filter cake was washed twice with 300 mL of a 20% solution of water in ethanol. The product was then dried on a filter paper at room temperature or in a vacuum oven at 40-45° C. to yield a white to beige solid (472-474 g; 97%).

Example 6: Synthesis of N-(4-fluorophenyl)-N-(4-((7-methoxy-6-(methylcarbamoyl)quinolin-4-yl)oxy)phenyl)cyclopropane-1,1-dicarboxamide·½ fumaric acid (1·hemifumarate)—Method 2

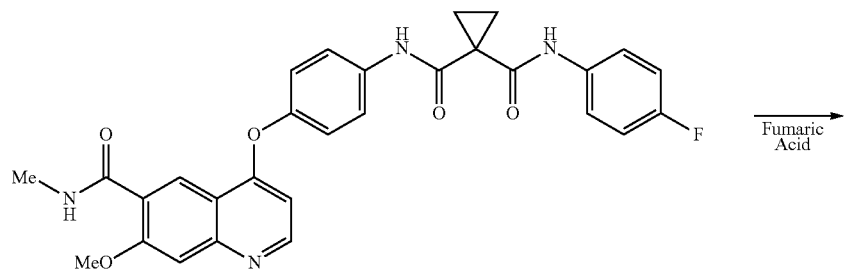

1

-continued

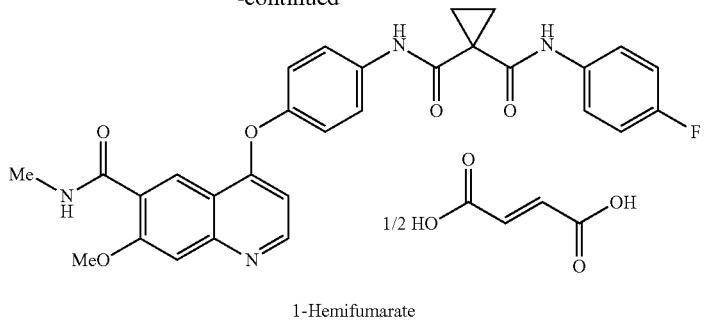

1-Hemifumarate

Fumaric acid (2.68 g, 1 eq.) and EtOH/acetone, 1:1 (48 mL) were added to a two-piece EasyMax (EM) reaction vessel, and heated to a reaction temperature of 50° C. to dissolve all material. In the adjacent EM pot, a 1-piece EM vessel containing Compound 1 (12.0 g, 1 eq.) was set to a jacket temperature of 50° C. The fumaric acid solution was transferred to the vessel containing Compound 1. Seed was charged (2% seed, 0.244 g), and the vessel was heated to reflux (~65° C.). After 1 hour, 0.5 mL of the slurry was filtered, washed with EtOH (6×1.5 mL) and analysed by HPLC to determine fumaric acid content (result should be about 10%). The slurry was then cooled to 25° C. over 1 hour and stirred for a further 1 hour. The solids were then filtered, washed with 1:1 EtOH/acetone (2×3 V), and dried over the weekend at 25° C. under vacuum. $^1$H NMR 700 MHz (DMSO-d$_6$) δ 1.473 (s, 4H), δ 4.009 (s, 3H), δ 2.839 (d, 3H, $^3J_{1H-1H}$=4.7 Hz), δ 2.840 (d, 3H, $^3J_{1H-1H}$=4.7 Hz), δ 6.450 (d, 1H, $^3J_{1H-1H}$=5.2 Hz), δ 6.632 (s, 2H), δ 6.635 (s, 2H), δ 7.137 (m, 2H), δ 7.244 (d, 2H, $^3J_{1H-1H}$=8.6 Hz), δ 7.494 (s, 1H), δ 7.642 (m, 2H), δ 7.776 (d, 2H, $^3J_{1H-1H}$=8.6 Hz), δ 8.361 (q, 1H, $^3J_{1H-1H}$=4.7 Hz), δ 8.618 (s, 1H), 8.615 (s, 1H), δ 8.638 (d, 1H, $^3J_{1H-1H}$=5.2 Hz), δ 10.070 (s, 1H), δ 10.216 (s, 1H), δ 13.164 (s, 1H). $^{19}$F NMR 700 MHz (DMSO-d$_6$; ref. trifluorotoluene at −63.72 ppm) δ−121.460. $^{13}$C NMR 700 MHz (DMSO-d$_6$) δ 15.46, δ 26.47, δ 31.60, δ 56.15, δ 102.91, δ 107.83, δ 114.55, δ 115.05 (d, $^2J_{19F-13C}$=22.2 Hz), δ 121.15, δ 122.23, δ 122.43 (d, $^3J_{19F-13C}$=7.6 Hz), δ 124.35, δ 125.24, δ 134.03, δ 135.22 (d, $^4J_{19F-13C}$=2.4 Hz), δ 136.73, δ 149.08, δ 151.46, δ 153.18, δ 157.94, δ 158.30 (d, $^1J_{19F-13C}$=240.2 Hz), δ 161.76, δ 164.89, δ 168.16, and δ 168.16. $^{15}$N NMR 700 MHz (DMSO-d$_6$) δ 106.25 ($^{15}$N), δ 127.79 ($^{15}$N), δ 128.86 ($^{15}$N), δ 166.04, δ 289.56 ($^{15}$N).

Other Embodiments

The foregoing disclosure has been described in some detail by way of illustration and example, for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive.

The scope of the invention should, therefore, be determined not with reference to the above description, but should instead be determined with reference to the following appended claims, along with the full scope of equivalents to which such claims are entitled.

What is claimed is:

1. A process for preparing a compound of Formula I

Formula I

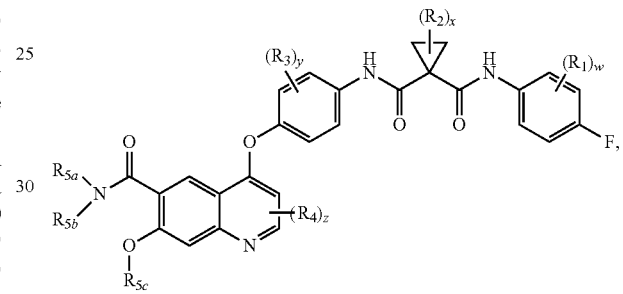

or a pharmaceutically acceptable salt thereof, comprising contacting a compound of Formula II Formula II

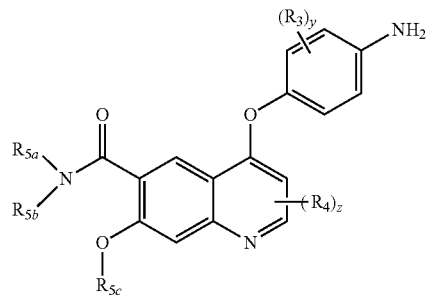

with a compound of Formula III

Formula III

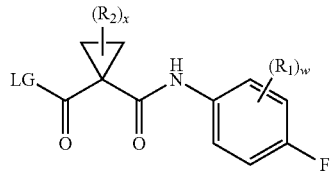

in the presence of a solvent and a base, wherein
LG is a leaving group selected from Cl, Br, I, HOAt, HOBt, and an organotriphosphate compound;

R₁ is selected from halo, $C_{1-6}$ alkyl, $C_{1-6}$ alkoxy, and $C_{3-6}$ cycloalkyl;

R₂ and R₃ are each independently selected from halo and $C_{1-6}$ alkyl;

R₄ is selected from halo, $C_{1-6}$ alkyl, $C_{1-6}$ alkoxy, $C_{3-6}$ cycloalkyl, $C_{3-6}$ heterocycloalkyl, phenyl, and $C_{3-6}$ heteroaryl;

$R_{5a}$ is selected from H, OH, NH₂, $C_{1-8}$ alkyl, $C_{3-6}$ cycloalkyl, $C_{3-6}$ heterocycloalkyl, phenyl, and $C_{3-6}$ heteroaryl, wherein the up to three methylene units of the $C_{1-8}$ alkyl are optionally and independently replaced with —O—, NR'—, —C(O)—, —C(O)O—, and —C(O)NR'—, wherein $R_{5a}$ is optionally substituted with up to three substituents selected from halo, CN, NO₂, NH₂, SH, OR', C(O)OR', C(O)R', C(O)NR'₂, $C_{1-4}$ alkyl, $C_{3-6}$ cycloalkyl, $C_{3-6}$ heterocycloalkyl, and $C_{3-6}$ heteroaryl;

$R_{5b}$ is H or $C_{1-6}$ alkyl; or $R_{5a}$ and $R_{5b}$ together with the nitrogen to which they are attached form a $C_{3-6}$ heterocycloalkyl optionally substituted with halo, CN, OH, NO₂, NH₂, SH, OR', C(O)OR', C(O)R', C(O)NR'₂, $C_{1-4}$ alkyl, $C_{3-6}$ cycloalkyl, $C_{3-6}$ heterocycloalkyl, or $C_{3-6}$ heteroaryl;

$R_{5c}$ is H or $C_{1-6}$ alkyl optionally substituted with halo, CN, OH, NH₂, or OR';

R' is H or $C_{1-6}$ alkyl, and w, x, y, and z are each independently an integer from 0 to 4;

and wherein the process optionally further comprises contacting the compound of Formula I with an acid to produce a pharmaceutically acceptable salt of the compound of Formula I.

2. The process of claim 1, wherein the base is an inorganic base selected from NaOH, Na₂CO₃, K₂CO₃, NaHCO₃, and KHCO₃, and the solvent is a mixture of water and an organic solvent selected from acetone, acetonitrile, butanediol, dimethylformamide, dimethoxyethane, dimethyl sulfoxide, 1,4-dioxane, ethanol, ethylene glycol, furfuryl alcohol, glycerol, methanol, methyl isocyanide, N-methyl-2-pyrrolidone, 1-propanol, 1,3-propanediol, 1,5-pentanediol, 2-propanol, propylene glycol, tetrahydrofuran, and triethylene glycol.

3. The process of claim 2, wherein the solvent is a mixture of water and tetrahydrofuran which is from approximately 2:1 tetrahydrofuran:water to approximately 3:1 tetrahydrofuran:water.

4. The process of claim 1, wherein contacting a compound of Formula II with a compound of Formula III comprises adding a solution of the compound of Formula III dissolved in a first solvent to a solution of the compound of Formula II dissolved in a second solvent to create a reaction mixture, wherein the first solvent is tetrahydrofuran and the second solvent is approximately 2:1 tetrahydrofuran:water.

5. The process of claim/0, wherein the reaction mixture is maintained at a temperature at approximately 20 to 25° C., and then heated to 35-40° C. and let stand to separate to an organic phase and an aqueous phase, followed by discarding the aqueous phase, heating the organic phase to 55-60° C., and then filtering the organic phase at 55-60° C.

6. The process of claim 1, further comprising reacting a compound of Formula IV

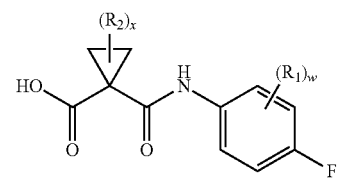

Formula IV with a reagent selected from thionyl chloride and oxalyl chloride to produce the compound of Formula III

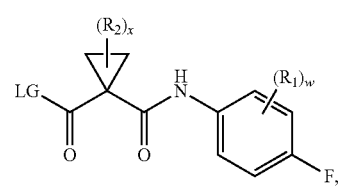

Formula III wherein LG is Cl.

7. The process of claim 6, wherein the reagent is oxalyl chloride and reacting the compound of Formula IV with the reagent is performed in the presence of a catalytic amount of dimethylformamide and tetrahydrofuran at a temperature between 5° C. and 15° C.

8. The process of claim 1, further comprising reacting a compound of Formula V

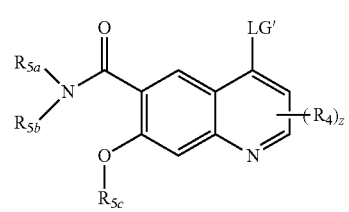

Formula V with a compound of Formula VI

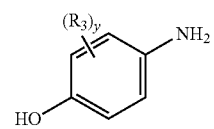

Formula VI to provide the compound of Formula II

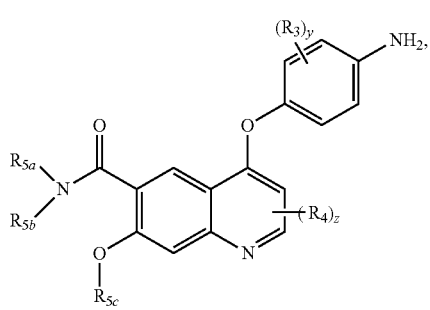

Formula II wherein LG' is selected from F, Cl, Br, I,

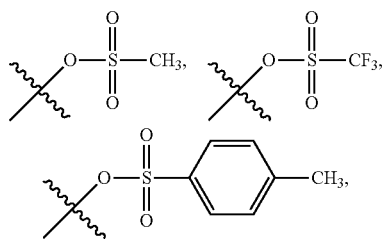

and —$N_2^+$.

9. The process of claim 8, wherein reacting a compound of Formula V with a compound of Formula VI is performed in the presence of a solvent and a base, wherein the solvent is an organic solvent selected from acetone, acetonitrile, dimethylsulfoxide, dimethylformamide, dimethylacetamide, hexamethylphosphoric triamde (HMPT), tetrahydrofuran, 1,4-dioxane, and dichloromethane, and the base is selected from n-BuLi, lithium diisopropyl amide, lithium hexamethyldisilazide, sodium hexamethyldisilazide, sodium hydroxide, sodium methoxide, sodium t-butoxide, sodium t-pentoxide, lithium hydroxide, lithium methoxide, lithium t-butoxide, lithium t-pentoxide, potassium hydroxide, potassium methoxide, potassium t-butoxide, potassium t-pentoxide, cesium hydroxide, cesium methoxide, cesium t-butoxide, and cesium t-pentoxide.

10. The process of claim 8, wherein LG' is selected from F, Cl, Br, and

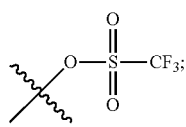 [SMILES: *OS(=O)(=O)C(F)(F)F]

w is 0;
x is 0;
y is 0;
z is 0;
$R_{5a}$ is methyl;
$R_{5b}$ is H; and
$R_{5c}$ is methyl.

11. A process for preparing Compound 1

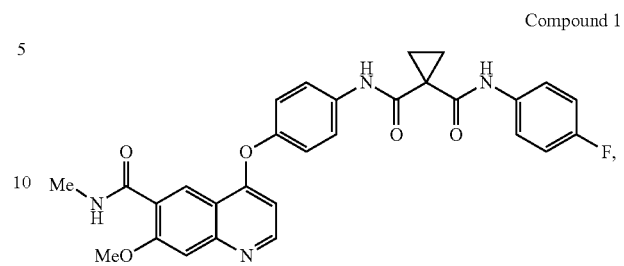

Compound 1 or a pharmaceutically acceptable salt thereof, comprising contacting Compound 4

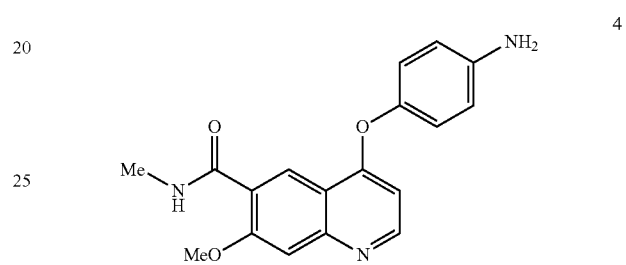

4 with a compound of Formula III'

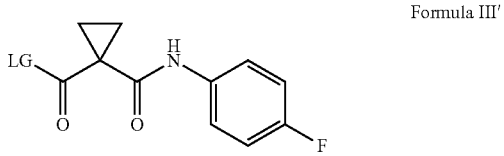

Formula III' in the presence of a solvent and a base, wherein LG is a leaving group selected from Cl, Br, I, HOAt, HOBt, and an organotriphosphate compound, and wherein the process optionally further comprises contacting Compound 1 with an acid to produce a pharmaceutically acceptable salt of Compound 1.

12. The process of claim 11, wherein the base is an inorganic base selected from NaOH, $Na_2CO_3$, $K_2CO_3$, $NaHCO_3$, and $KHCO_3$, and the solvent is a mixture of water and an organic solvent selected from acetone, acetonitrile, butanediol, dimethylformamide, dimethoxyethane, dimethyl sulfoxide, 1,4-dioxane, ethanol, ethylene glycol, furfuryl alcohol, glycerol, methanol, methyl isocyanide, N-methyl-2-pyrrolidone, 1-propanol, 1,3-propanediol, 1,5-pentanediol, 2-propanol, propylene glycol, tetrahydrofuran, and triethylene glycol.

13. The process of claim 11, wherein the solvent is a mixture of water and tetrahydrofuran which is from approximately 2:1 tetrahydrofuran:water to approximately 3:1 tetrahydrofuran:water.

14. The process of claim 11, wherein contacting Compound 4 with the compound of Formula III' comprises adding a solution of the compound of Formula III' dissolved in a first solvent to a solution of Compound 4 dissolved in a second solvent to create a reaction mixture, wherein the first solvent is tetrahydrofuran, and the second solvent is approximately 2:1 tetrahydrofuran:water.

15. The process of claim 14, wherein the temperature of the reaction mixture is maintained at approximately 20 to 25° C., then heated to 35-40° C. and then let stand to separate to an organic phase and an aqueous phase, followed by discarding the aqueous phase, heating the organic phase to 55-60° C., and then filtering the organic phase at 55-60° C.

16. The process of claim 11, further comprising reacting Compound 6

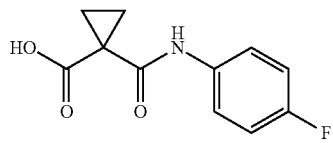

with a reagent selected from thionyl chloride and oxalyl chloride to produce Compound 7

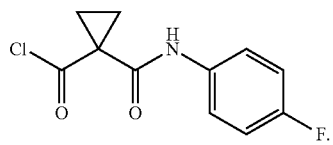

17. The process of claim 16, wherein the reagent is oxalyl chloride, and reacting Compound 6 with the reagent is performed in the presence of a catalytic amount of dimethylformamide and tetrahydrofuran at a temperature between 5° C. and 15° C.

18. The process of claim 11, further comprising reacting Compound 3

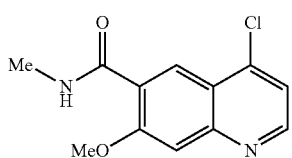

with 4-aminophenol to provide Compound 4

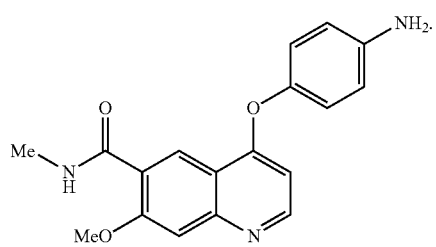

19. The process of claim 18, wherein reacting Compound 3 with 4-aminophenol is performed in the presence of a solvent and a base, wherein the solvent is selected from acetone, acetonitrile, dimethylsulfoxide, dimethylformamide, dimethylacetamide, hexamethylphosphoric triamde (HMPT), tetrahydrofuran, 1,4-dioxane, and dichloromethane, and the base is selected from n-BuLi, lithium diisopropyl amide, lithium hexamethyldisilazide, sodium hexamethyldisilazide, sodium hydroxide, sodium methoxide, sodium t-butoxide, sodium t-pentoxide, lithium hydroxide, lithium methoxide, lithium t-butoxide, lithium t-pentoxide, potassium hydroxide, potassium methoxide, potassium t-butoxide, potassium t-pentoxide, cesium hydroxide, cesium methoxide, cesium t-butoxide, and cesium t-pentoxide.

20. The process of claim 11, further comprising reacting Compound 1 with fumaric acid to provide Compound 1-hemifumarate

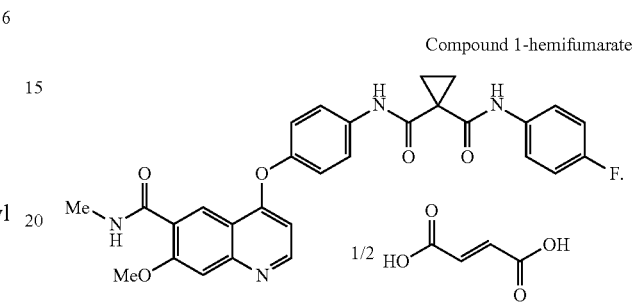

21. The process of claim 20, wherein reacting Compound 1 with fumaric acid is performed in the presence of a solvent selected from water, an alcoholic solvent, THF, DMF, MEK, acetonitrile, 1,4-dioxane, and MTBE, or any combination thereof.

22. The process of claim 21, wherein reacting Compound 1 with fumaric acid comprises adding a mixture of fumaric acid dissolved in a 20% solution of water in ethanol at 45-50° C. to Compound 1 to create a reaction mixture, and further comprises heating the reaction mixture to reflux, stirring the reaction mixture for 4-6 hours at reflux, cooling the reaction mixture, and separating Compound 1-hemifumarate from the solvent.

23. A process for preparing Compound 1

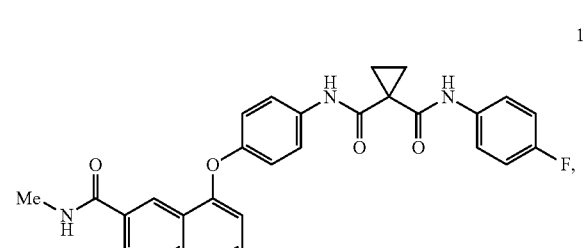

or a pharmaceutically acceptable salt thereof, comprising: reacting Compound 3

with 4-aminophenol in the presence of dimethylacetamide and sodium t-pentoxide, at a temperature that is from 75 to 80° C., to provide a first reaction mixture comprising Compound 4

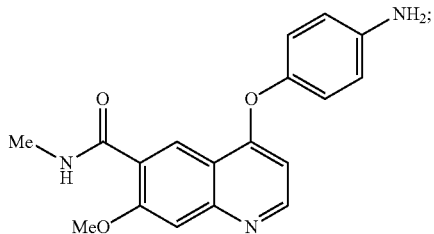

precipitating and isolating Compound 4 as a solid by adding water to the first reaction mixture;

reacting Compound 6

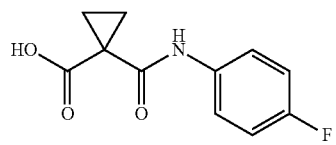

with oxalyl chloride in the presence of tetrahydrofuran and a catalytic amount of dimethylformamide at a temperature that is from 5 to 15° C. to produce a second reaction mixture comprising Compound 7

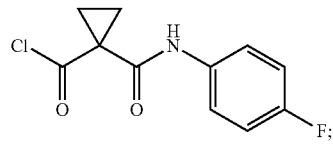

adding the second reaction mixture to a third reaction mixture comprising a solvent that is approximately 2:1 tetrahydrofuran:water, a base that is $K_2CO_3$, and Compound 4, over a period of at least 30 minutes to create a fourth reaction mixture wherein the temperature of the fourth reaction mixture is maintained below approximately 27° C. during the addition;

heating the fourth reaction mixture to 35-40° C. and letting stand to separate to an organic phase and an aqueous phase;

discarding the aqueous phase, heating the organic phase to 55-60° C., and then filtering the organic phase at 55-60° C.;

adding water to the organic phase over a period of at least one hour to create a fifth reaction mixture;

stirring the fifth reaction mixture for at least 2 hours; and isolating Compound 1 as a solid product, wherein the process optionally further comprises contacting Compound 1 with an acid to produce a pharmaceutically acceptable salt of Compound 1.

24. The process of claim 1, wherein LG is selected from Cl, Br, I, and an organotriphosphate compound.

25. The process of claim 11, wherein LG is selected from Cl, Br, I, and an organotriphosphate compound.

* * * * *